(12) United States Patent
Aida

(10) Patent No.: US 11,914,191 B2
(45) Date of Patent: Feb. 27, 2024

(54) OPTICAL BRANCHING/COUPLING DEVICE AND OPTICAL BRANCHING/COUPLING METHOD

(71) Applicant: NEC Corporation, Tokyo (JP)

(72) Inventor: Ryuji Aida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 380 days.

(21) Appl. No.: 17/431,229

(22) PCT Filed: Feb. 3, 2020

(86) PCT No.: PCT/JP2020/003884
§ 371 (c)(1),
(2) Date: Aug. 16, 2021

(87) PCT Pub. No.: WO2020/175020
PCT Pub. Date: Sep. 3, 2020

(65) Prior Publication Data
US 2022/0113471 A1  Apr. 14, 2022

(30) Foreign Application Priority Data

Feb. 26, 2019  (JP) ................................. 2019-032721

(51) Int. Cl.
*G02B 6/293* (2006.01)
*G02B 6/28* (2006.01)
(Continued)

(52) U.S. Cl.
CPC ....... *G02B 6/29383* (2013.01); *G02B 6/2835* (2013.01); *G02B 6/2938* (2013.01); *H04B 10/077* (2013.01); *H04J 14/02* (2013.01)

(58) Field of Classification Search
CPC .............................................. G02B 6/29383
See application file for complete search history.

(56) References Cited

U.S. PATENT DOCUMENTS 6,061,157 A    5/2000  Terahara
7,437,075 B2 * 10/2008  Doerr .................. H04J 14/0213
                                                                      398/83
(Continued)

FOREIGN PATENT DOCUMENTS

EP      3334062 A1    6/2018
JP    H10173598 A    6/1998
(Continued)

OTHER PUBLICATIONS

Extended European Search Report for EP Application No. 20762162.4 dated Mar. 24, 2022.
(Continued)

*Primary Examiner* — Chris H Chu
(74) *Attorney, Agent, or Firm* — Sughrue Mion, PLLC

(57) ABSTRACT

To provide an optical branch coupler which facilitates communizing the design of an optical transmission path, the optical branch coupler comprising: a first add drop unit for outputting a third optical signal to a first line in which a first optical signal received from the first line and a second optical signal inserted into the first line are multiplexed and outputting the first optical signal; and a second add drop unit for receiving the first optical signal, receiving a sixth optical signal from a second line different from the first line in which a fourth optical signal and a fifth optical signal dropped from the second line are wavelength multiplexed, demultiplexing the fourth and fifth optical signals, and outputting a seventh optical signal to the second line in which the fourth optical signal and the first optical signal transmitted by the first add drop unit are multiplexed.

16 Claims, 15 Drawing Sheets

(51) Int. Cl.
*H04B 10/077* (2013.01)
*H04J 14/02* (2006.01)

(56) References Cited

U.S. PATENT DOCUMENTS

| | | | | |
|---|---|---|---|---|
| 2002/0172458 | A1* | 11/2002 | Downie | H04B 10/572 |
| | | | | 385/27 |
| 2004/0208584 | A1* | 10/2004 | Keller | H04J 14/0213 |
| | | | | 385/24 |
| 2007/0053633 | A1* | 3/2007 | Doerr | G02B 6/12007 |
| | | | | 385/27 |
| 2007/0237524 | A1 | 10/2007 | Gerstel et al. | |
| 2011/0076017 | A1 | 3/2011 | Midorikawa et al. | |
| 2011/0311216 | A1 | 12/2011 | Inoue | |
| 2015/0093111 | A1 | 4/2015 | Wang et al. | |
| 2019/0305870 | A1 | 10/2019 | Aida | |
| 2021/0109281 | A1* | 4/2021 | Ling | G02B 6/124 |

FOREIGN PATENT DOCUMENTS

| | | | |
|---|---|---|---|
| JP | 2006180417 | A | 7/2006 |
| JP | 2011077808 | A | 4/2011 |
| WO | 2018079445 | A | 5/2018 |

OTHER PUBLICATIONS

International Search Report for PCT Application No. PCT/JP2020/003884, dated Apr. 7, 2020.
English translation of Written opinion for PCT Application No. PCT/JP2020/003884, dated Apr. 7, 2020.

\* cited by examiner

Fig. 3

OPTICAL BRANCHING/COUPLING DEVICE AND OPTICAL BRANCHING/COUPLING METHOD

This application is a National Stage Entry of PCT/JP2020/003884 filed on Feb. 3, 2020, which claims priority from Japanese Patent Application 2019-032721 filed on Feb. 26, 2019, the contents of all of which are incorporated herein by reference, in their entirety.

TECHNICAL FIELD

The present invention relates to an optical branching/coupling device and an optical branching/coupling method, and more specifically to an optical branching/coupling device including a function of splitting and coupling a wavelength-multiplexed optical signal, and an optical branching/coupling method being used for the device.

BACKGROUND ART

FIG. 14 is a diagram illustrating a configuration of a general submarine cable system 9000. In the submarine cable system 9000, three terminal stations (an A terminal station 1, a B terminal station 2, and a C terminal station 3) are connected to an optical branching/coupling device 90 via a submarine cable 4. In the following description and drawings, for example, an optical signal to be transmitted from the A terminal station 1 to the B terminal station 2 is referred to as [AB], and an optical signal to be transmitted from the A terminal station 1 to the C terminal station 3 is referred to as [AC]. An optical signal to be transmitted between other terminal stations is also described similarly. [AB][AC] indicates that the optical signal [AB] and the optical signal [AC] are transmitted as a wavelength-multiplexed optical signal (hereinafter, referred to as a "WDM signal"), based on wavelength multiplexing of the signals. It is assumed that wavelength bands of the optical signals to be wavelength-multiplexed do not overlap. WDM is an abbreviation of wavelength division multiplexing.

The optical branching/coupling device 90 achieves, by using a wavelength selective switch (WSS), a wavelength switching function (ROADM function) settable from an outside. The WSS includes a function of demultiplexing and multiplexing an input optical signal having a plurality of wavelength bands with respect to each wavelength. WSS is an abbreviation of wavelength selective switch, and ROADM is an abbreviation of reconfigurable optical add/drop multiplexing (a resettable optical branching/coupling function).

In FIG. 14, the optical signal [AB] and an optical signal [BA] are transmitted between the A terminal station 1 and the B terminal station 2. The optical signal [AC] and an optical signal [CA] are transmitted between the A terminal station 1 and the C terminal station 3. Optical signals [BC] and [CB] are transmitted between the B terminal station 2 and the C terminal station 3. The optical branching/coupling device 90 splits and couples the WDM signals received from the A terminal station 1 and the B terminal station 2 with respect to each wavelength and transmits the resulting signals to the A terminal station 1, the B terminal station 2, and the C terminal station 3. Specifically, the B terminal station 2 transmits an optical signal [BA][BC] to the optical branching/coupling device 90, and the optical branching/coupling device 90 transmits an optical signal [BA][CA] to the A terminal station 1. Hereinafter, a configuration in which the C terminal station 3 communicates with both the A terminal station 1 and the B terminal station 2 in this manner is referred to as "bidirectional communication".

Herein, an intensity of the optical signal [BA][BC] to be transmitted from the B terminal station 2 to the optical branching/coupling device 90 and an intensity of the optical signal [BA][CA] to be transmitted from the optical branching/coupling device 90 to the A terminal station 1 preferably maintain close values to an extent possible. The reason is that, when a difference between the intensity of the optical signal to be transmitted from the B terminal station 2 to the optical branching/coupling device 90 and the intensity of the optical signal to be transmitted from the optical branching/coupling device 90 to the A terminal station 1 is small, a design method for both optical transmission paths and a device are easily commonalized.

In relation to the present invention, PTL 1 describes an optical branching/coupling device that includes a configuration in which the WSS is redundant and transmits/receives a WDM signal between terminal stations.

CITATION LIST

Patent Literature

[PTL 1] International Publication No. WO 2018/079445

SUMMARY OF INVENTION

Technical Problem

FIG. 15 is a diagram illustrating a configuration of another general submarine cable system 9001. In the submarine cable system 9001, a C terminal station 3 communicates with only a B terminal station 2 but does not communicate with an A terminal station 1. In this case, an optical branching/coupling device 90 transmits only an optical signal [BA] to the A terminal station 1. Hereinafter, a configuration in which the C terminal station 3 communicates with only either of the A terminal station 1 and the B terminal station 2 is referred to as "unidirectional communication". FIG. 15 illustrates an example of the unidirectional communication in which the C terminal station 3 communicates with only the B terminal station 2.

In the configuration of the unidirectional communication in FIG. 15, the C terminal station 3 does not transmit the optical signal [CA] to the A terminal station 1, and therefore an intensity of an optical signal to be transmitted from the optical branching/coupling device 90 to the A terminal station 1 becomes lower than an intensity of an optical signal to be transmitted from the B terminal station 2 to the optical branching/coupling device 90, compared with the configuration of the bidirectional communication in FIG. 14. As a result, in the submarine cable system 9001, it is difficult to apply a common design method and device to an optical transmission path through which an optical signal travels from the B terminal station 2 to the optical branching/coupling device 90 and an optical transmission path through which an optical signal travels from the optical branching/coupling device 90 to the A terminal station 1.

Object of Invention

An object of the present invention is to provide an optical branching/coupling device that eases commonalization of design of an optical transmission path.

Solution to Problem

An optical branching/coupling device according to the present invention includes:

a first add/drop means that outputs, to a first line, a third optical signal acquired by multiplexing a first optical signal received from the first line with a second optical signal to be inserted into the first line, and outputs the first optical signal; and a second add/drop means that receives the first optical signal, receives, from a second line different from the first line, a sixth optical signal acquired by wavelength-multiplexing a fourth optical signal with a fifth optical signal to be dropped from the second line, demultiplexer the fourth optical signal and the fifth optical signal, and outputs, to the second line, a seventh optical signal acquired by multiplexing the fourth optical signal with the first optical signal transmitted by the first add/drop means.

An optical branching/coupling method according to the present invention includes:

receiving a first optical signal from a first line;

outputting, to the first line, a third optical signal acquired by multiplexing the first optical signal with a second optical signal to be inserted into the first line;

receiving, from a second line different from the first line, a sixth optical signal acquired by wavelength-multiplexing a fourth optical signal with a fifth optical signal to be dropped from the second line;

demultiplexing the fourth optical signal and the fifth optical signal; and outputting, to the second line, a seventh optical signal acquired by multiplexing the fourth optical signal with the first optical signal.

Advantageous Effects of Invention

The present invention provides an optical branching/coupling device and an optical branching/coupling method that have high reliability and ease design of an optical transmission path.

BRIEF DESCRIPTION OF DRAWINGS

FIG. 3 is a diagram illustrating a case where the optical branching/coupling device 10 performs bidirectional communication.

EXAMPLE EMBODIMENT

Figure 1:
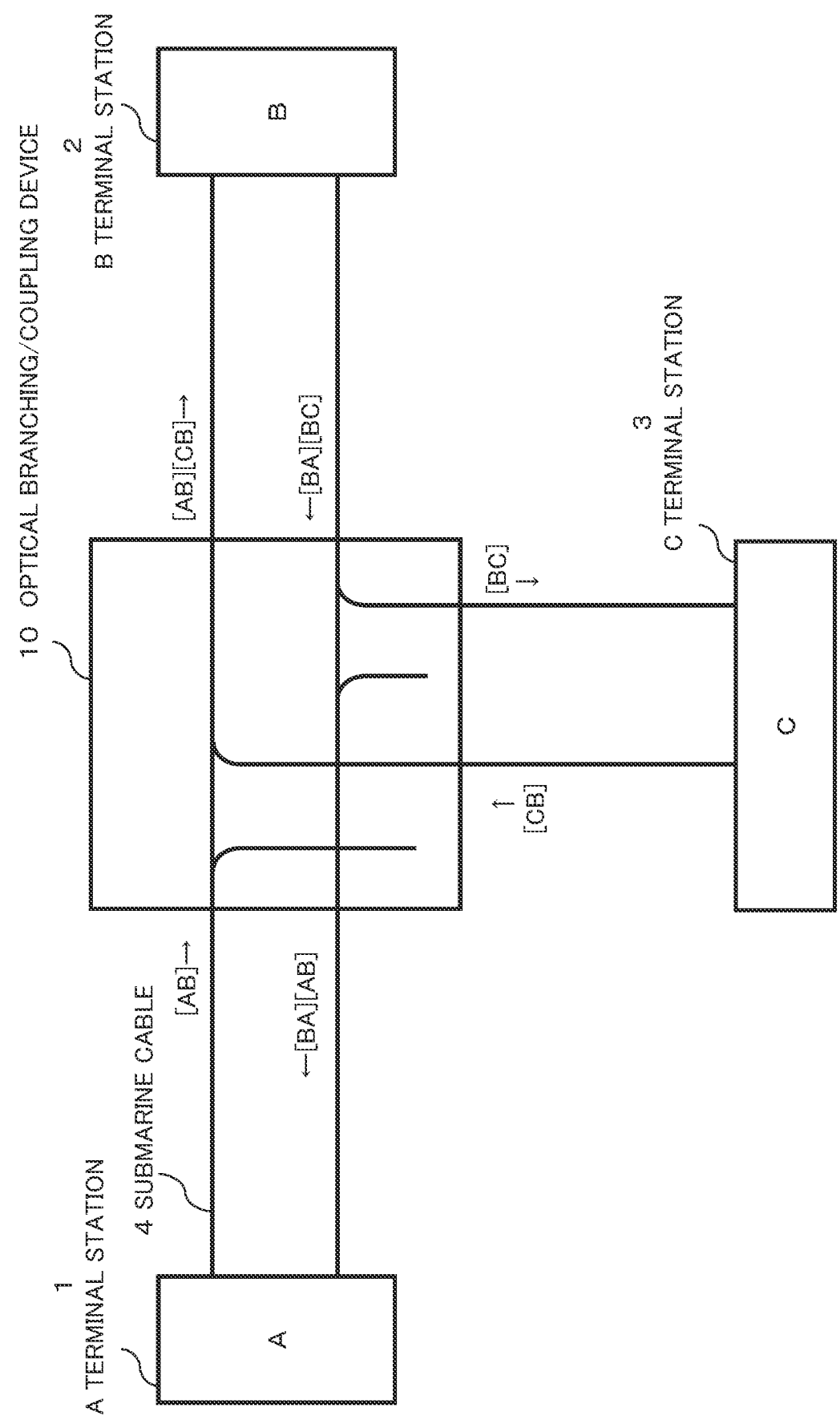
FIG. 1 is a block diagram illustrating a configuration example of a submarine cable system 1000 according to a first example embodiment.

Example embodiments according to the present invention are described below. An arrow in drawings is added as an example for illustrating a direction of an optical signal according to the example embodiments and does not indicate that a direction of an optical signal is limited. An intersection between straight lines each indicating a path of a signal in block diagrams does not indicate, unless otherwise specifically described, that intersecting signals are split or coupled. In the drawings, a known element is assigned with the same reference sign and overlapping description therefor is omitted. It is assumed that wavelength bands of optical signals to be wavelength-multiplexed do not overlap.

First Example Embodiment

FIG. 1 is a block diagram illustrating a configuration example of a submarine cable system 1000 according to a first example embodiment of the present invention. The submarine cable system 1000 includes an A terminal station 1, a B terminal station 2, a C terminal station 3, and an optical branching/coupling device 10. The A terminal station 1, the B terminal station 2, and the C terminal station 3 may be collectively referred to as terminal stations 1 to 3.

FIG. 1 illustrates an example of unidirectional communication in which the C terminal station 3 communicates with only the B terminal station 2. The terminal stations 1 to 3 each are a terminal station to be installed on land and are an interface between a signal being transmitted through a submarine cable 4 and an onshore network. The terminal stations 1 to 3 are connected via the optical branching/coupling device 10 and the submarine cable 4. The submarine cable 4 includes an optical fiber for transmitting an optical signal. The submarine cable 4 may include, midway, an optical repeater and another optical branching/coupling device.

The optical branching/coupling device 10 is a node including a ROADM function and is also referred to as a ROADM branching/coupling device or a ROADM node. The optical branching/coupling device 10 is installed on a sea bottom, splits and couples an input optical signal in a wavelength unit, and switches an output destination of the optical signal in the wavelength unit. The ROADM function may be controlled from any one of the terminal stations 1 to 3.

The A terminal station 1 transmits an optical signal [AB] to the optical branching/coupling device 10, and the C terminal station 3 transmits an optical signal [CB] to the optical branching/coupling device 10. The optical signal [AB] is an optical signal, addressed to the B terminal station 2, transmitted by the A terminal station 1, and the optical signal [CB] is an optical signal, addressed to the B terminal station 2, transmitted by the C terminal station 3. The optical branching/coupling device 10 multiplexes (wavelength-multiplexes) the optical signal [AB] with the optical signal

[CB], generates an optical signal [AB][CB], and transmits the generated optical signal [AB][CB] to the B terminal station 2. The optical signal [AB][CB] is a WDM signal in which the optical signal [AB] and the optical signal [CB] are wavelength-multiplexed.

The B terminal station 2 transmits an optical signal [BA][BC] to the optical branching/coupling device 10. The optical branching/coupling device 10 demultiplexer (wavelength-demultiplexer) optical signals [BA] and [BC] from the optical signal [BA][BC] and transmits the optical signal [BC] to the C terminal station 3. The optical branching/coupling device 10 multiplexes the demultiplexed optical signal [BA] with the optical signal [AB] received from the A terminal station 1, generates an optical signal [BA][AB], and transmits the generated optical signal [BA][AB] to the A terminal station 1. The optical signal [BA][AB] is a WDM signal in which the optical signal [BA] and the optical signal [AB] are wavelength-multiplexed.

Figure 15:
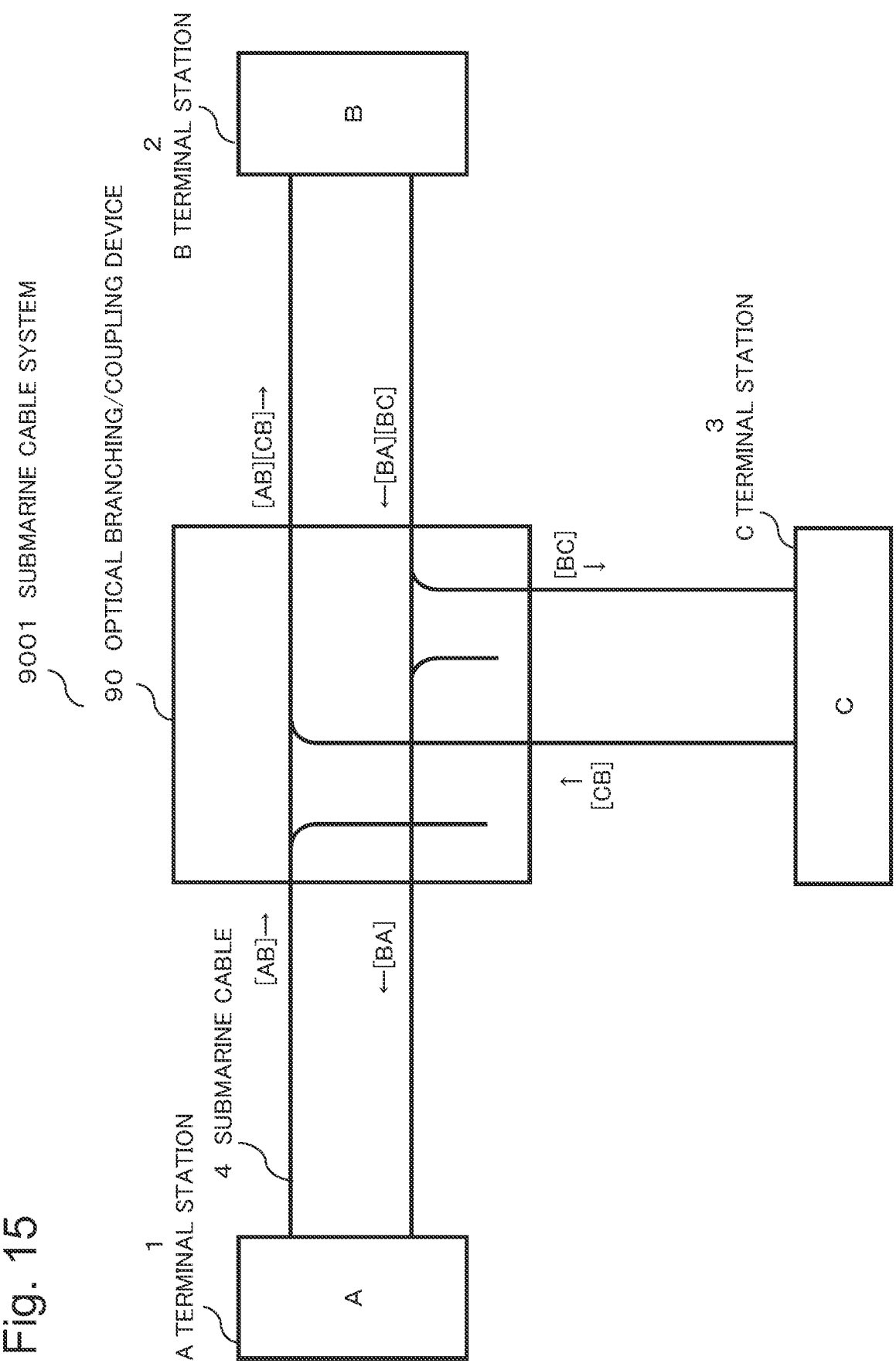
FIG. 15 is a diagram illustrating a configuration of another general submarine cable system 9001.

In this manner, the optical branching/coupling device 10 transmits, to the A terminal station 1, the optical signal [BA][AB] acquired by multiplexing the optical signal [BA] from the B terminal station 2 to the A terminal station 1 with the optical signal [AB] received from the A terminal station 1. As a result, compared with a case where, for example, only an optical signal [BA] illustrated in FIG. 15 is transmitted to the A terminal station 1, an intensity of an optical signal to be transmitted from the optical branching/coupling device 10 to the A terminal station 1 is high. Therefore, in the submarine cable system 1000, a design method and a device similar to an optical transmission path from the B terminal station 2 to the optical branching/coupling device 10 where the optical signal [BA][BC] is transmitted is easily applied also to an optical transmission path from the optical branching/coupling device 10 to the A terminal station 1.

A detailed configuration example and operation example of the optical branching/coupling device 10 are described. FIG. 2 to FIG. 11 each are a block diagram illustrating the example of the configuration and the operation of the optical branching/coupling device 10. In these drawings, the terminal stations 1 to 3 connected to the optical branching/coupling device 10 are also illustrated.

(1. Case where Communication is Performed Only Between a Terminal Station 1 and B Terminal Station 2)

Figure 2:
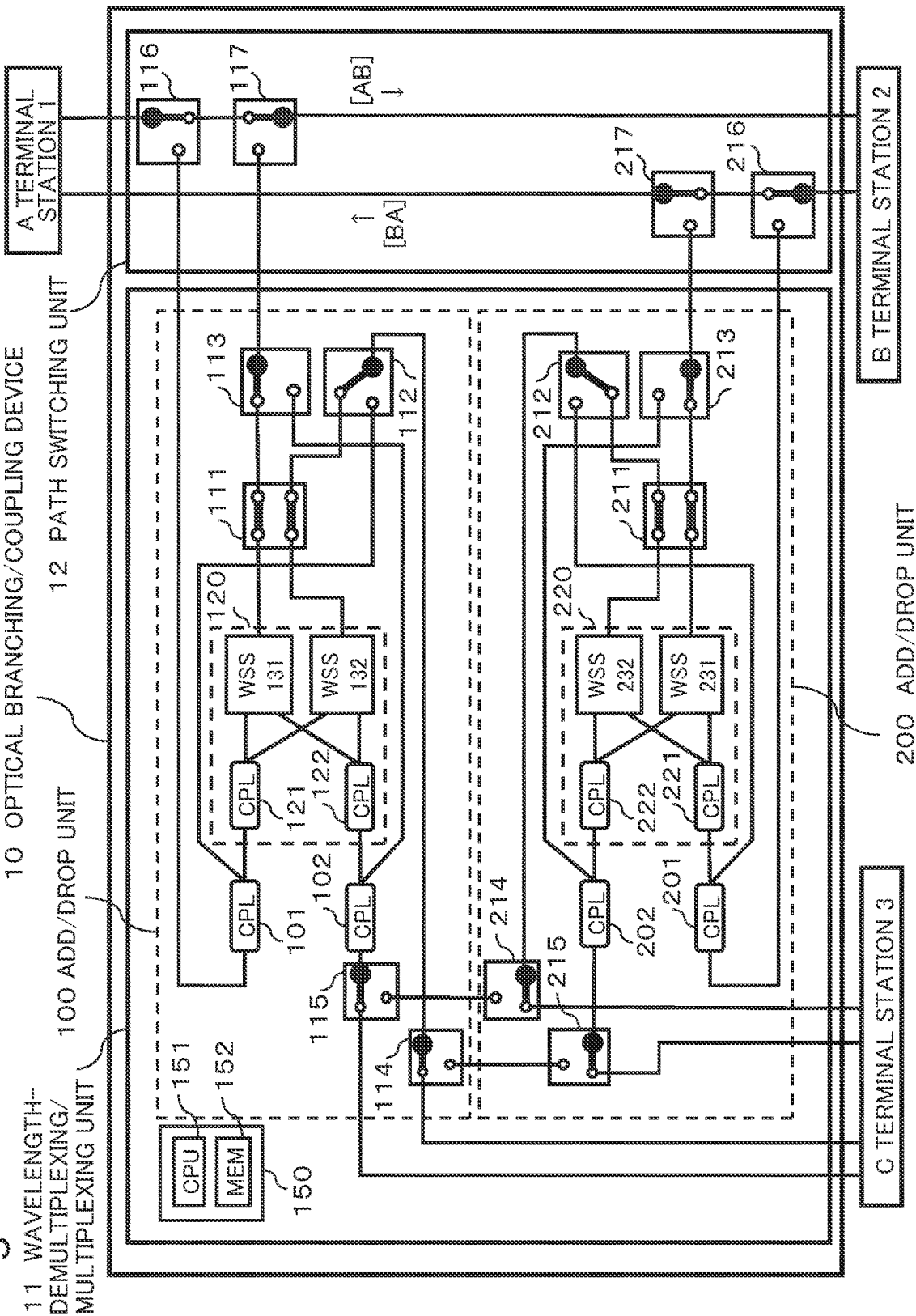
FIG. 2 is a diagram illustrating an example in which an optical branching/coupling device 10 communicates only between an A terminal station 1 and a B terminal station 2.

FIG. 2 is a diagram illustrating an example in which communication is performed only between the A terminal station 1 and the B terminal station 2. Referring to FIG. 2, the optical branching/coupling device 10 includes a wavelength-demultiplexing/multiplexing unit 11 and a path switching unit 12. The wavelength-demultiplexing/multiplexing unit 11 includes add/drop units 100 and 200. The wavelength-demultiplexing/multiplexing unit 11 includes a ROADM function for an optical signal to be transmitted/received among the terminal stations 1 to 3. The wavelength-demultiplexing/multiplexing unit 11 may further include a control circuit 150, a central processing unit (CPU) 151, and a storage device (MEM) 152. Optical components included in the optical branching/coupling device 10 are connected by an optical circuit using an optical fiber, an optical waveguide, optical space propagation, or the like. Details of the configuration of the wavelength-demultiplexing/multiplexing unit 11 are described in FIG. 3 and thereafter.

The path switching unit 12 includes switches 116, 117, 216, and 217. The switches 116, 117, 216, and 217 each are a 1×2 optical switch and set connection between the A terminal station 1 and the B terminal station 2 and the wavelength-demultiplexing/multiplexing unit 11. In FIG. 2, these optical switches are set in such a way that the A terminal station 1 and the B terminal station 2 are directly connected without interposing the wavelength-demultiplexing/multiplexing unit 11 between the terminal stations. Therefore, optical signals [AB] and [BA] to be transmitted between the A terminal station 1 and the B terminal station 2 are not processed in the wavelength-demultiplexing/multiplexing unit 11. FIG. 2 illustrates a case where, for example, the C terminal station 3 does not operate.

(2. Case of Bidirectional Communication)

Figure 3:
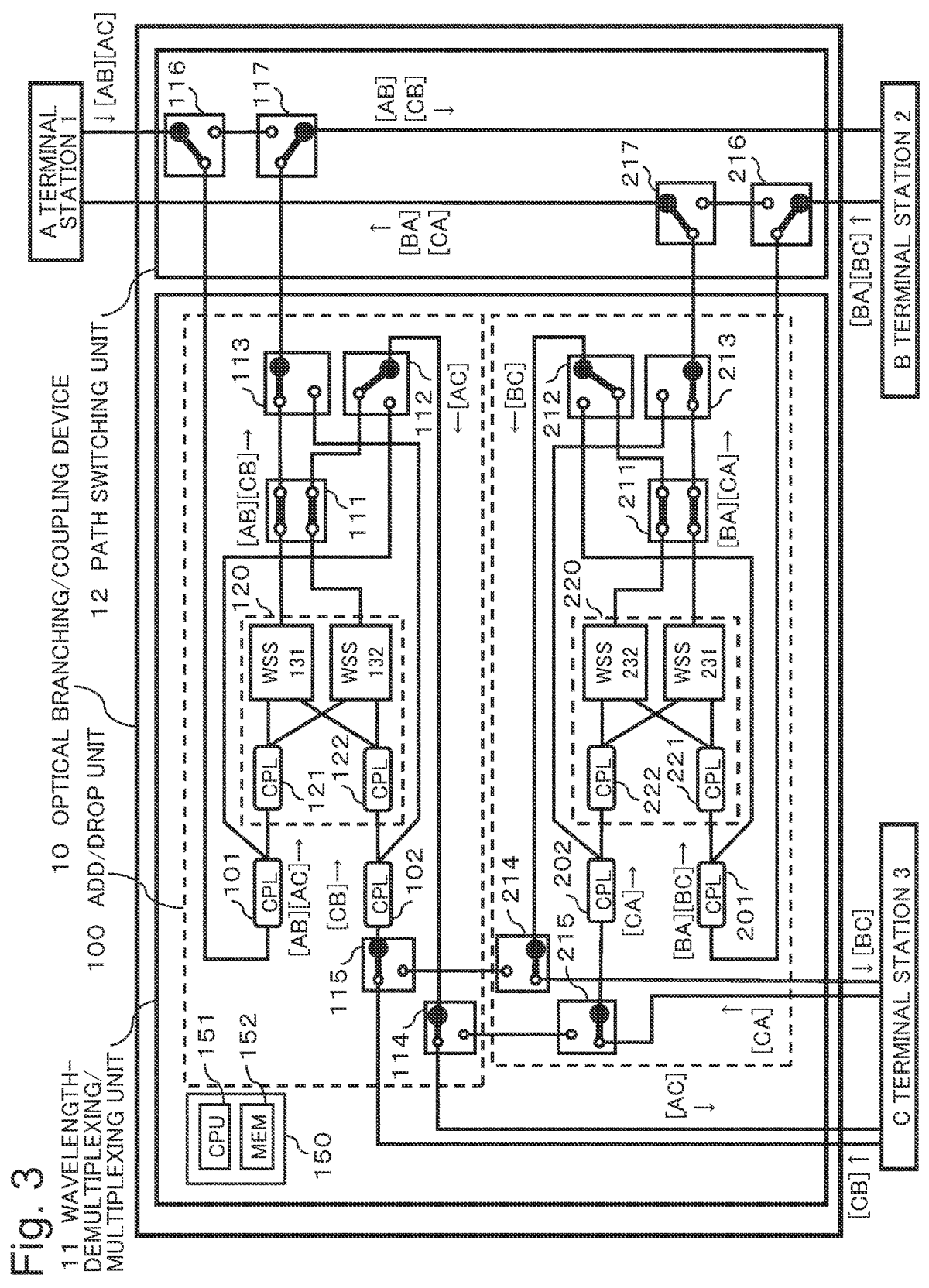

Before a case of unidirectional communication illustrated in FIG. 1 is described, it is described that the optical branching/coupling device 10 can be used for bidirectional communication. FIG. 3 illustrates an example of a configuration and an operation of the optical branching/coupling device 10 in a case of the bidirectional communication in which the C terminal station 3 communicates with both the A terminal station 1 and the B terminal station 2. In FIG. 3, each of the switches 116, 117, 216, and 217 of the path switching unit 12 is controlled in such a way that an optical transmission path connecting the A terminal station 1 and the B terminal station 2 is connected to the wavelength-demultiplexing/multiplexing unit 11. As a result, the add/drop units 100 and 200 demultiplex and multiplex optical signals input from the terminal stations 1 to 3.

The add/drop unit 100 and the add/drop unit 200 include basically the same configuration, and therefore in the following, the add/drop unit 100 is described. The add/drop unit 100 includes a configuration similar to the optical branching/coupling device described in PTL 1. However, the add/drop unit 100 is different from the optical branching/coupling device described in PTL 1 in that the add/drop unit 100 includes at least switches 114 and 115 and is connectable to the add/drop unit 200. The switches 114 and 115 each are a 1×2 optical switch.

The add/drop unit 100 includes couplers (CPLs) 101 to 102 and 121 to 122, switches 111 to 115, and WSSs 131 and 132. The couplers 101, 102, 121, and 122 each are a 1×2 optical coupler, split an input optical signal into two parts, and output the split two signals. A split ratio of each coupler is, but not limited to, for example, 1/1. As the couplers 101 to 102 and 121 to 122, an optical fiber fusion coupler or an optical waveguide coupler is usable.

The switch 111 is a 2×2 optical switch including two input ports and two output ports, and the switches 112 to 115 each are a 1×2 optical switch. As the switches 111 to 115, an optical waveguide switch, a mechanical switch, or a micro electro mechanical systems (MEMS) switch is usable.

The WSSs 131 and 132 each are a wavelength selective switch including at least two input ports and one output port. The WSSs 131 and 132 demultiplex and multiplex, in a wavelength unit, an optical signal input from each input port and output the resulting optical signal from each output port. Connection between input/output ports inside the WSSs 131 and 132 and wavelength bands of the optical signals to be output from the WSSs 131 and 132 may be controlled from an outside (e.g., any one of the terminal stations 1 to 3) of the optical branching/coupling device 10 or may be controlled from the control circuit 150. Connection (i.e., switching of an optical path) of inputs/outputs of the switches 111 to 115 may be also controlled from an outside of the optical branching/coupling device 10 or the control circuit 150. The control circuit 150 may include a function of monitoring an operation state (e.g., whether a failure occurs) of the WSSs 131 and 132 and control the switches 111 to 115, based on the operation state of the WSSs 131 and 132.

A block in which the couplers 121 and 122 and the WSSs 131 and 132 of the add/drop unit 100 are combined includes a function of outputting an optical signal of a wavelength selected based on a wavelength of an input optical signal. Therefore, the block can be referred to as a wavelength selection unit 120. Similarly, a block in which the couplers 221 and 222 and the WSSs 231 and 232 of the add/drop unit 200 are combined includes, similarly to the add/drop unit 100, a function of outputting an optical signal of a wavelength selected based on a wavelength of an input optical signal. Therefore, the block can be referred to as a wavelength selection unit 220.

While not illustrated in the drawings, in an optical transmission path inside the add/drop units 100 and 200, an optical amplifier may be provided. As the optical amplifier, an optical fiber amplifier and a semiconductor optical amplifier are usable. The optical amplifier compensates a loss of an optical signal propagating inside the add/drop units 100 and 200. When the optical amplifier is an optical fiber amplifier, the optical amplifier may add a modulation to drive current of a pumping laser diode (LD) and thereby generate a response signal for reporting a state of the add/drop unit 100 to any one of the terminal stations 1 to 3. The control circuit 150 may control the optical amplifier.

The bidirectional communication in which the C terminal station 3 communicates with the A terminal station 1 and the B terminal station 2 is described in more detail. Referring to FIG. 3, an optical signal [AB][AC] transmitted by the A terminal station 1 is input to the add/drop unit 100 via the switch 116. The optical signal [AB][AC] input to the add/drop unit 100 is input to one of the input ports of each of the WSSs 131 and 132 via the couplers 101 and 121. An optical signal [CB] transmitted from the C terminal station 3 passes through the switch 115 and the couplers 102 and 122 and is input to the other input port of each of the WSSs 131 and 132.

As described above, the optical signal [AB][AC] is input to the WSS 131 from the coupler 121, and the optical signal [CB] is input to the WSS 131 from the coupler 122. The WSS 131 demultiplexes an optical signal [AB] from the optical signal [AB][AC], multiplexes the demultiplexed optical signal [AB] with the optical signal [CB], and generates an optical signal [AB][CB]. The generated optical signal [AB][CB] is output from the WSS 131 to one of the inputs of the switch 111.

The optical signal [AB][AC] and the optical signal [CB] are input also to the WSS 132. The WSS 132 demultiplexes an optical signal [AC] from the input optical signal [AB][AC]. The optical signal [AC] is input to the other input of the switch 111.

In FIG. 3, the switches 111, 113, and 117 are controlled in such a way that the optical signal [AB][CB] is output to the B terminal station 2 via the switches 111, 113, and 117. The switches 111, 112, and 114 are controlled in such a way that the optical signal [AC] is output to the C terminal station 3 via the switches 111, 112, and 114.

In this manner, the optical signal [AB] included in the optical signal [AB][AC] transmitted by the A terminal station 1 and the optical signal [CB] transmitted by the C terminal station 3 are transmitted to the B terminal station 2 being a destination of each of the transmitted signals. The optical signal [AC] included in the optical signal [AB][AC] is transmitted to the C terminal station 3 being a destination of the transmitted signal.

Processing based on the add/drop unit 200 for an optical signal [BA][BC] and an optical signal [CA] is executed, similarly to processing based on the add/drop unit 100 for the optical signal [AB][AC] and the optical signal [CB]. In other words, the optical signal [BA][BC] is input to the WSSs 231 and 232 from the coupler 221, and the optical signal [CA] is input to the WSSs 231 and 232 from the coupler 222. The WSS 231 multiplexes an optical signal [BA] with the optical signal [CA] and generates an optical signal [BA][CA]. The generated optical signal [BA][CA] is output from the WSS 231 to the switch 211. The WSS 232 outputs an optical signal [BC] to the switch 211. In FIG. 3, the switches 211, 213, and 217 are controlled in such a way that the optical signal [BA][CA] is output to the B terminal station 2 via the switches 211, 213, and 217. The switches 211, 212, and 214 are controlled in such a way that the optical signal [BC] is output to the C terminal station 3 via the switches 211, 213, and 217.

As a result, the optical signal [BA] included in the optical signal [BA][BC] transmitted by the B terminal station 2 and the optical signal [CA] transmitted by the C terminal station 3 are transmitted to the A terminal station 1 being a destination of each of the transmitted signals. The optical signal [BC] included in the optical signal [BA][BC] is transmitted to the C terminal station 3 being a destination of the transmitted signal. In this manner, the optical branching/coupling device 10 in FIG. 3 achieves bidirectional communication.

In the configuration of FIG. 3, when the WSS 131 fails and the WSS 132 normally operates, the WSS 132 can generate the optical signal [AB][CB]. In this case, the switch 111 is controlled in such a way that the optical signal [AB][CB] to be output by the WSS 132 is output to the B terminal station 2 via the switches 113 and 117. The optical signal [AB][AC] including the optical signal [AC] may be output, by connecting the switch 112 to the coupler 101, to the C terminal station 3. Based on such control, even when the WSS 131 fails, transmission of the optical signal [AB], the optical signal [CB], and the optical signal [AC] is maintained. The same applies when the WSS 231 fails and the WSS 232 normally operates, and the WSS 232 generates the optical signal [BA][CA] and the switches 211, 213, and 217 are controlled in such a way that the optical signal [BA][CA] is output to the A terminal station 1. In this case, the optical signal [BA][BC] including the optical signal [BC] is output, by connecting the switch 212 to the coupler 201, to the C terminal station 3. In this manner, transmission of the optical signal [BA], the optical signal [CA], and the optical signal [BC] is maintained.

(3-1. Case (1) of Unidirectional Communication)

Figure 4:
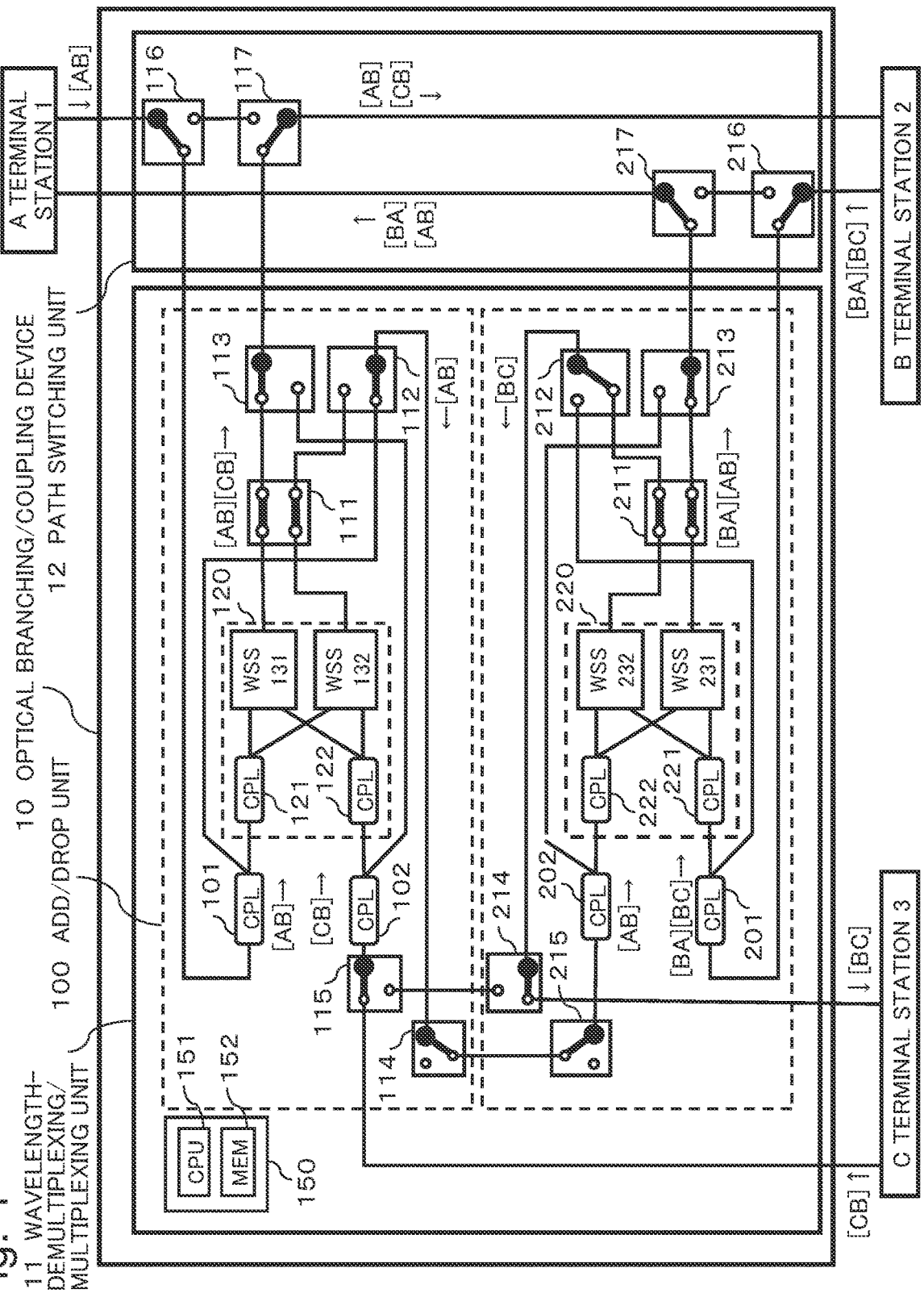
FIG. 4 is a diagram illustrating a first case where the optical branching/coupling device 10 performs unidirectional communication.

A case where the optical branching/coupling device 10 performs the unidirectional communication is described. FIG. 4 illustrates an example of a configuration of the optical branching/coupling device 10 and an operation of the device in which the C terminal station 3 communicates with only the B terminal station 2 and does not communicate with the A terminal station 1 (hereinafter, referred to as a "first case"). In the first case, the C terminal station 3 transmits only an optical signal [CB] to the B terminal station 2 and receives only an optical signal [BC] from the B terminal station 2. The A terminal station 1 transmits only an optical signal [AB] and receives an optical signal [AB][BA]. The B terminal station 2 transmits an optical signal [BA][BC] and receives an optical signal [AB][CB]. Note that in the drawings described below, connection between each of the switches 114, 115, 214, and 215 and the C terminal station 3 is illustrated only when necessary.

The optical signal [AB] is input to the WSS 131 via the couplers 101 and 121 and the optical signal [CB] is input to the WSS 131 via the couplers 102 and 122. The WSS 131 multiplexes the optical signal [AB] with the optical signal [CB] and generates an optical signal [AB][CB]. The generated optical signal [AB][CB] is output from the WSS 131 to one of the inputs of the switch 111.

The switches 111, 113, and 117 are controlled in such a way that the optical signal [AB][CB] is output to the B terminal station 2 via the switches 111, 113, and 117. The switches 112, 114, and 215 are controlled in such a way that the optical signal [AB] split in the coupler 101 is input, via these switches, to the coupler 202 of the add/drop unit 200. Therefore, an optical signal [BA][BC] is input from the coupler 221 to the WSS 231 and the WSS 232, and the optical signal [AB] is input from the coupler 222 to the WSS 231 and the WSS 232.

The WSS 231 multiplexes an optical signal [BA] with the optical signal [AB] and generates an optical signal [BA][AB]. The generated optical signal [BA][AB] is output from the WSS 231 to the switch 211. In FIG. 4, the switches 211, 213, and 217 are controlled in such a way that the optical signal [BA][AB] is output, via these switches, to the A terminal station 1. The WSS 232 demultiplexer the optical signal [BC] from the optical signal [BA][BC]. The demultiplexed optical signal [BC] is output from the WSS 232 to the switch 211. The switches 211, 212, and 214 are controlled in such a way that the optical signal [BC] output by the WSS 232 is output, via these switches, to the C terminal station 3.

In this manner, the optical signal [AB] transmitted by the A terminal station 1 and the optical signal [CB] transmitted by the C terminal station 3 are transmitted to the B terminal station 2 being a destination of each of the transmitted signals. The optical signal [BC] included in the optical signal [BA][BC] transmitted by the B terminal station 2 is output to the C terminal station 3 being a destination of the output signal. The optical signal [BA] included in the optical signal [BA][BC] transmitted by the B terminal station 2 is multiplexed with the optical signal [AB] and the resulting signal is transmitted to the A terminal station 1.

In the first case of the unidirectional communication, the optical signal [BA] addressed to the A terminal station 1 is multiplexed with the optical signal [AB]. As a result, the following advantageous effects are achieved.

(a) Compared with a case where the optical branching/coupling device 10 transmits only the optical signal [BA] to the A terminal station 1, an intensity of an optical signal to be transmitted by the optical branching/coupling device 10 is increased depending on an intensity of the optical signal [AB]. As a result, when an optical transmission path that transmits an optical signal from the optical branching/coupling device 10 to the A terminal station 1 is designed, a design method or a device for an optical transmission path that transmits an optical signal from the B terminal 2 to the optical branching/coupling device 10 can be easily applied. The optical branching/coupling device 10, for example, reduces an intensity difference between optical signals to be transmitted to the optical transmission path, and thereby it becomes easy to commonalize specifications of optical interfaces installed in both ends of the optical transmission path and optical repeaters installed in a middle of the optical transmission path. In other words, the optical branching/coupling device 10 eases design of a submarine cable system.

(b) The optical signal [AB] to be multiplexed with the optical signal [BA] in the optical branching/coupling device 10 is a signal transmitted by the A terminal station 1. Therefore, the optical signal [AB] addressed to the B terminal station 2 is concealed against a terminal station (e.g., the C terminal station 3) other than a terminal station that transmits/receives the optical signal [BA].

(c) The optical branching/coupling device 10 does not need to include a light source of an optical signal to be multiplexed with the optical signal [BA], and therefore a configuration of the optical branching/coupling device 10 can be avoided from being complex.

(3-2. Case where WSS 131 Fails in Unidirectional Communication)

Figure 5:
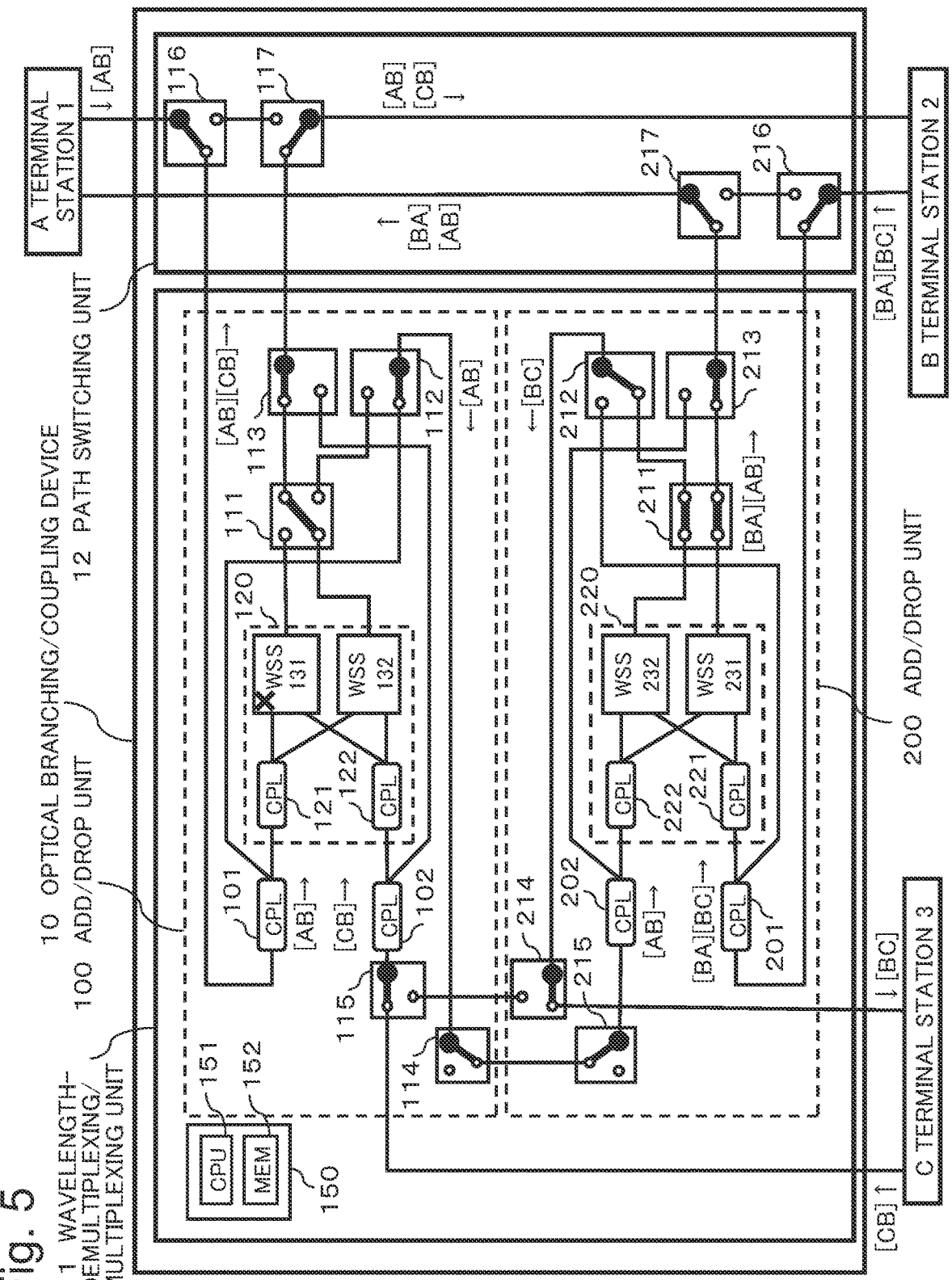
FIG. 5 is a diagram illustrating a case where a WSS 131 fails in the first case.

FIG. 5 is a diagram illustrating an operation example of the optical branching/coupling device 10 in which the WSS 131 fails in the first case illustrated in FIG. 4. In FIG. 5, a mark of "x" of the WSS 131 indicates that the WSS 131 fails. When the WSS 131 fails, the WSS 132 generates an optical signal [AB][CB]. The switch 111 is controlled in such a way that the optical signal [AB][CB] output by the WSS 132 is output to the B terminal station 2 via the switches 113 and 117. In other words, when the WSS 131 fails, the switch 111 is controlled in such a way as to connect the WSS 132 and the switch 113.

(3-3. Case where WSS 132 Fails in Unidirectional Communication)

Figure 6:
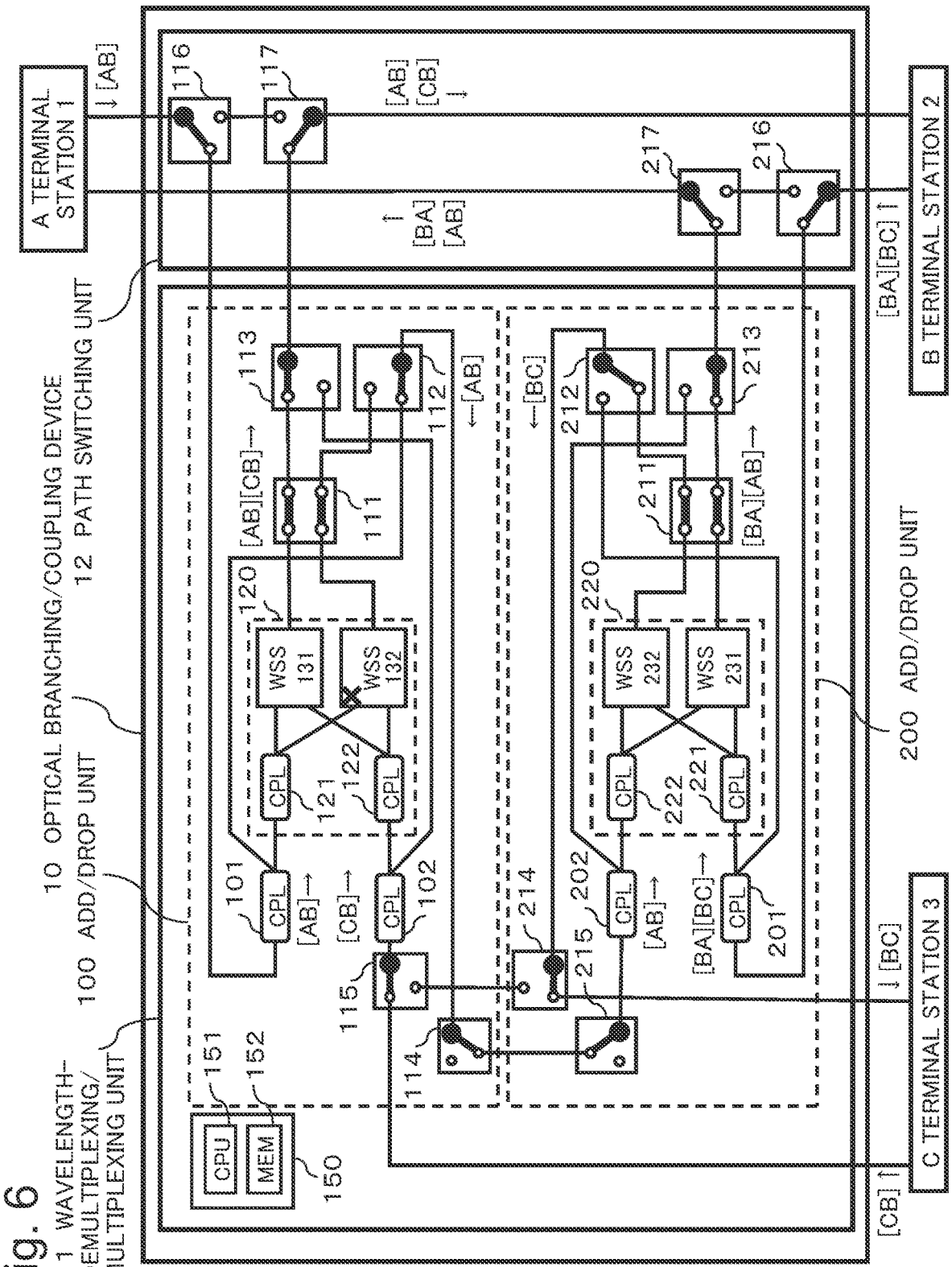
FIG. 6 is a diagram illustrating a case where a WSS 132 fails in the first case.

FIG. 6 is a diagram illustrating an operation example of the optical branching/coupling device 10 in which the WSS 132 fails in the first case illustrated in FIG. 4. In the configuration of FIG. 4, an output of the WSS 132 is not used. Therefore, as illustrated in FIG. 6, the optical branching/coupling device 10 can continue, even when the WSS 132 fails, the unidirectional communication without switching the switch 111 from the state in FIG. 4.

(3-4. Case where WSS 231 Fails in Unidirectional Communication)

Figure 7:
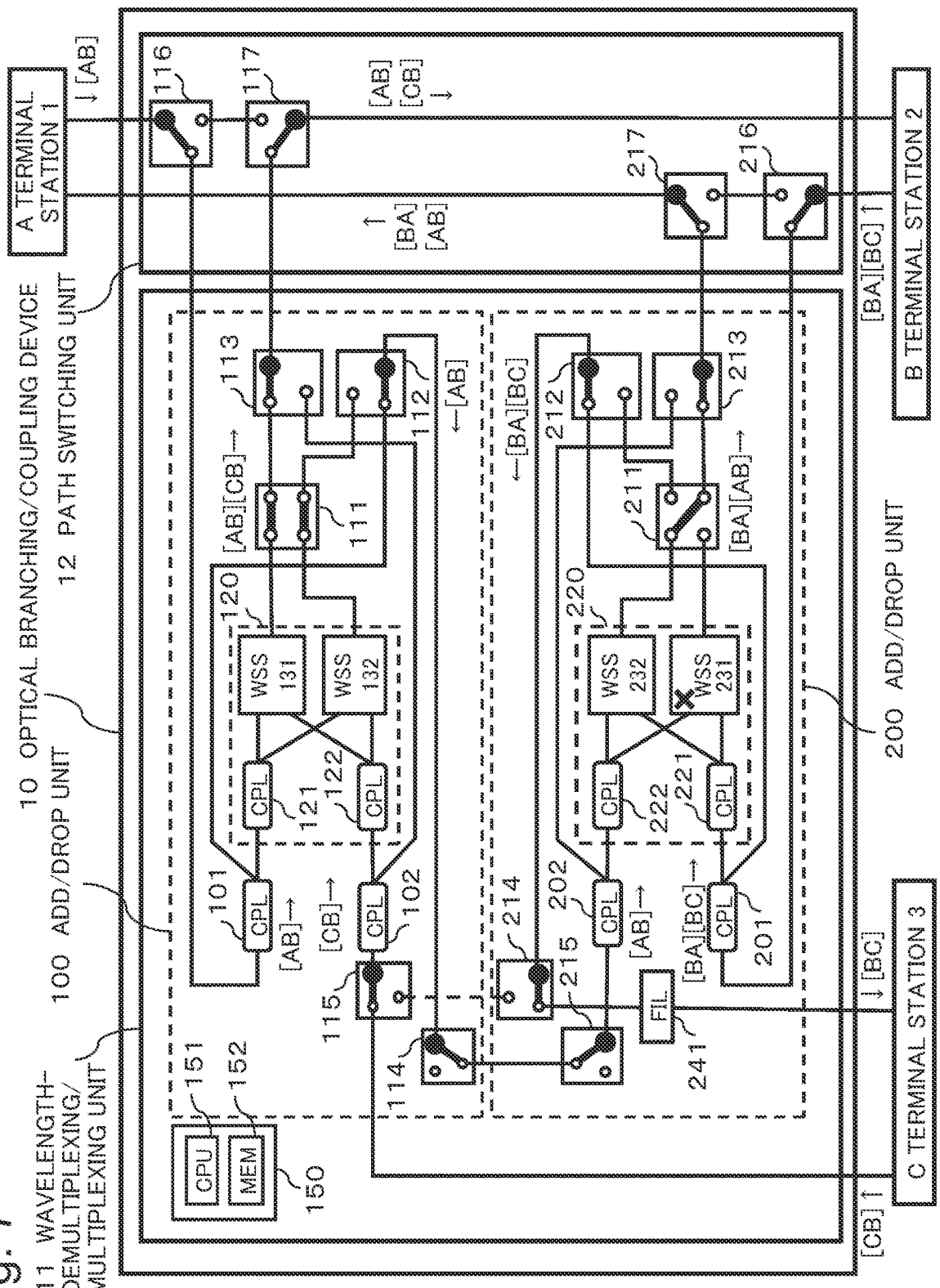
FIG. 7 is a diagram illustrating a case where a WSS 231 fails in the first case.

FIG. 7 is a diagram illustrating an operation example of the optical branching/coupling device 10 in which the WSS 231 fails in the first case illustrated in FIG. 4. In FIG. 7, a mark of "x" of the WSS 231 indicates that the WSS 231 fails. When the WSS 231 fails, the WSS 232 generates an optical signal [BA][AB]. The switch 211 is controlled in such a way that the optical signal [BA][AB] to be output by the WSS 232 is output to the A terminal station 1 via the switches 213 and 217. In other words, when the WSS 231 fails, the switch 211 is controlled in such a way as to connect the WSS 232 and the switch 213.

When the WSS 231 fails, the WSS 232 is used for generating the optical signal [BA][AB], and therefore it is difficult for the wavelength selection unit 220 to demultiplex, from an optical signal [BA][BC], an optical signal [BC] addressed to the C terminal station 3. Therefore, the optical signal [BA][BC] split in the coupler 201 is output from the switch 214 to the C terminal station 3 via the switch 212. In order to remove an optical signal [BA] from the optical signal [BA][BC] output from the switch 214, a filter 241 may be usable. The filter 241 is, for example, an optical bandpass filter through which only a wavelength band of the optical signal [BC] is transmitted. When the filter 241 is used, only the optical signal [BC] is transmitted to the C terminal station 3, and therefore the optical signal [BA] in which neither a transmission source nor a destination is the C terminal station 3 can be prevented from being received in the C terminal station 3. The filter 241 may be disposed in a middle of an optical path between the switch 215 and the C terminal station 3. In the first case, the filter 241 may be always disposed, regardless of an operation state of the optical branching/coupling device 10.

(3-5. Case where WSS 232 Fails in Unidirectional Communication)

Figure 8:
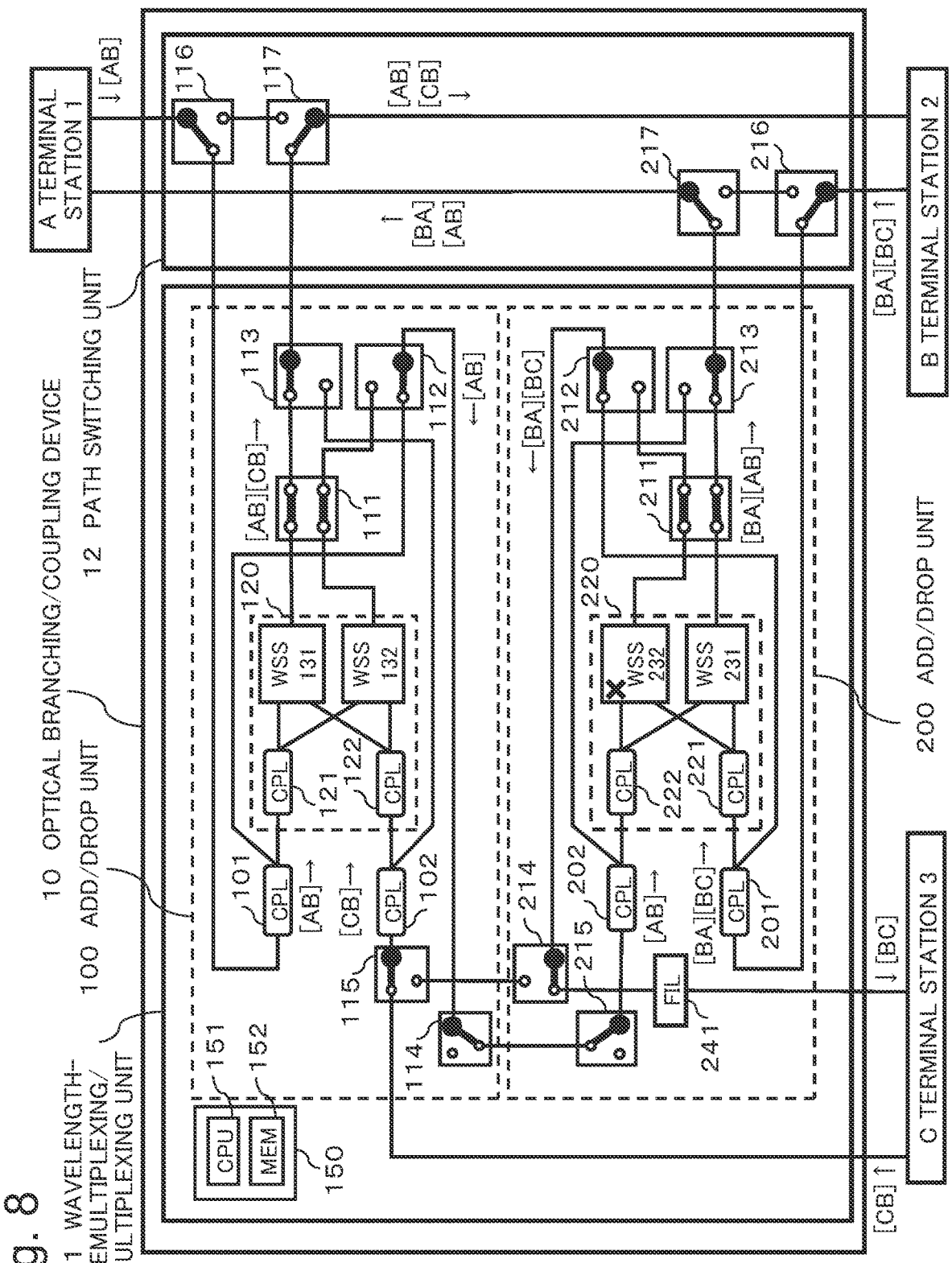
FIG. 8 is a diagram illustrating a case where a WSS 232 fails in the first case.

FIG. 8 is a diagram illustrating an operation example of the optical branching/coupling device 10 in which the WSS 232 fails in the first case illustrated in FIG. 4. When the WSS 232 fails, the WSS 231 generates an optical signal [BA] [AB]. The optical signal [BA][AB] is output to the A terminal station 1 via the switches 211, 213, and 217. In contrast, the switch 212 is controlled in such a way as to output an optical signal [BA][BC] split in the coupler 201 to the C terminal station 3 via the switch 214. Also, in the case of FIG. 8, similarly to the case in FIG. 7, the filter 241 through which only an optical signal [BC] is transmitted may be usable.

As described in FIG. 5 to FIG. 8, in the optical branching/coupling device 10, each of the add/drop units 100 and 200 includes a redundant configuration of the WSS. Therefore, the optical branching/coupling device 10 achieves an advantageous effect in which reliability for a function of the WSS is high, in addition to the advantageous effects of (a) to (c) described above.

(4-1. Case (2) of Unidirectional Communication)

Figure 9:
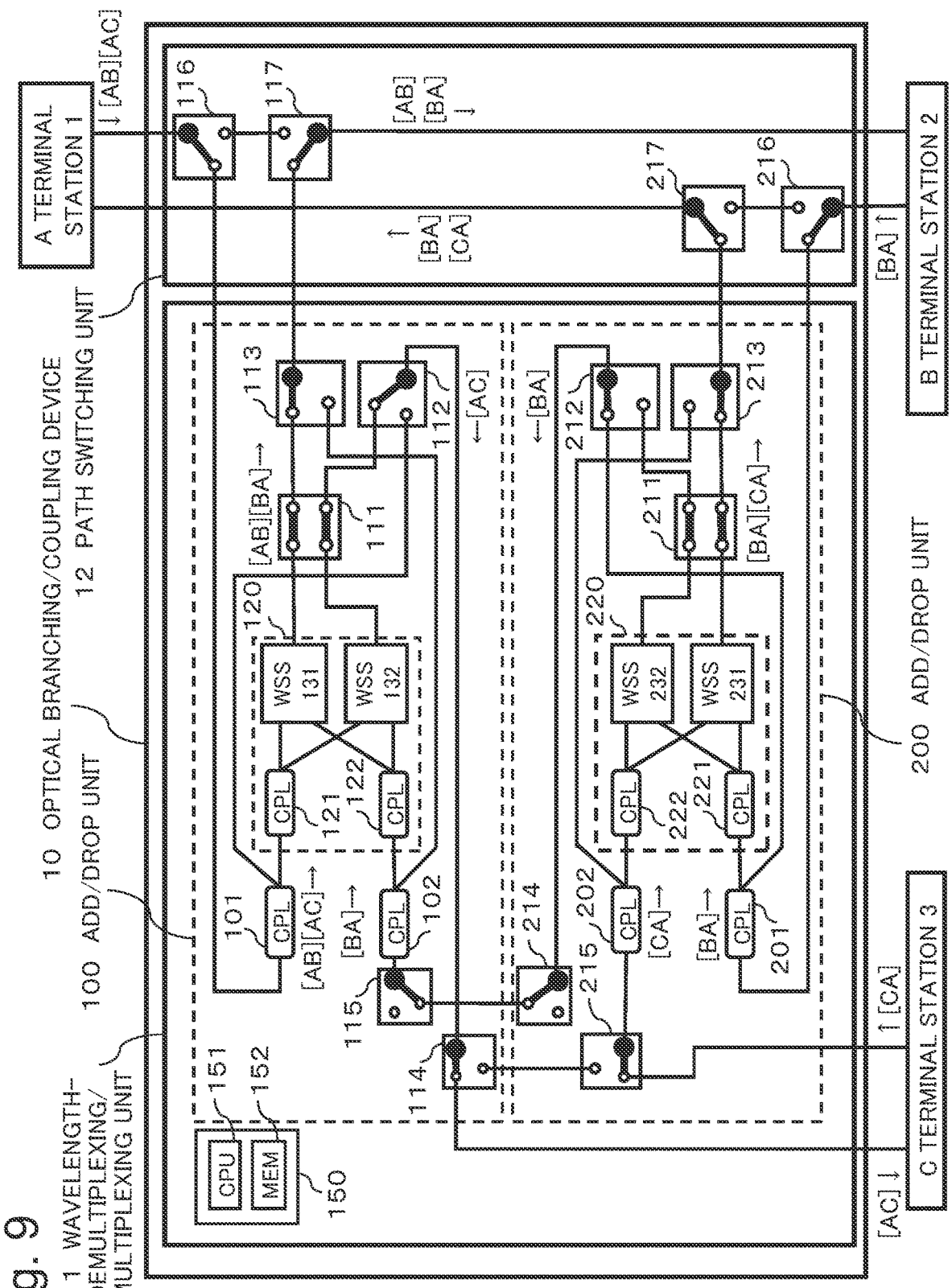
FIG. 9 is a diagram illustrating a second case where the optical branching/coupling device 10 performs the unidirectional communication.
Figure 10:
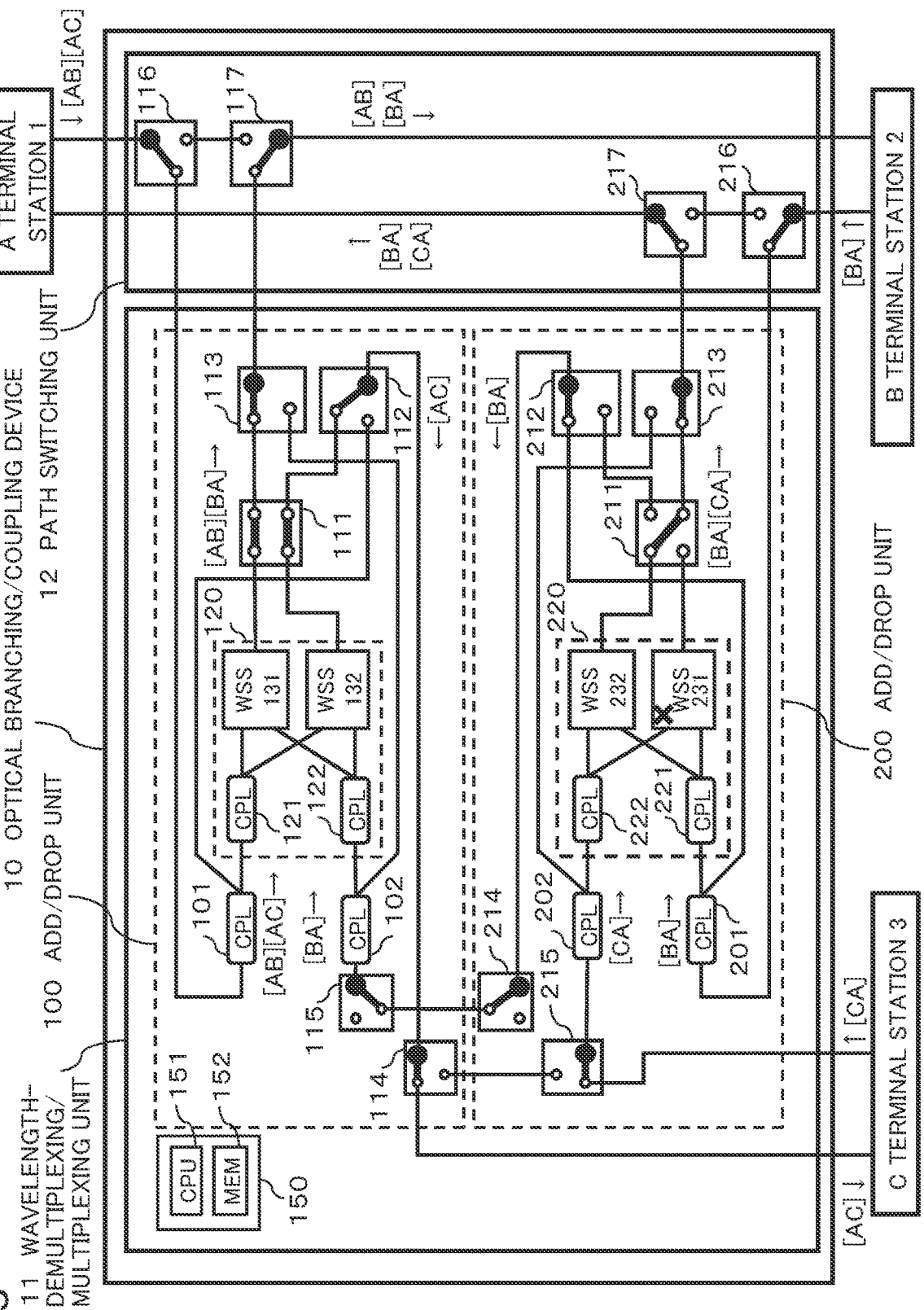
FIG. 10 is a diagram illustrating a case where the WSS 231 fails in the second case.
Figure 11:
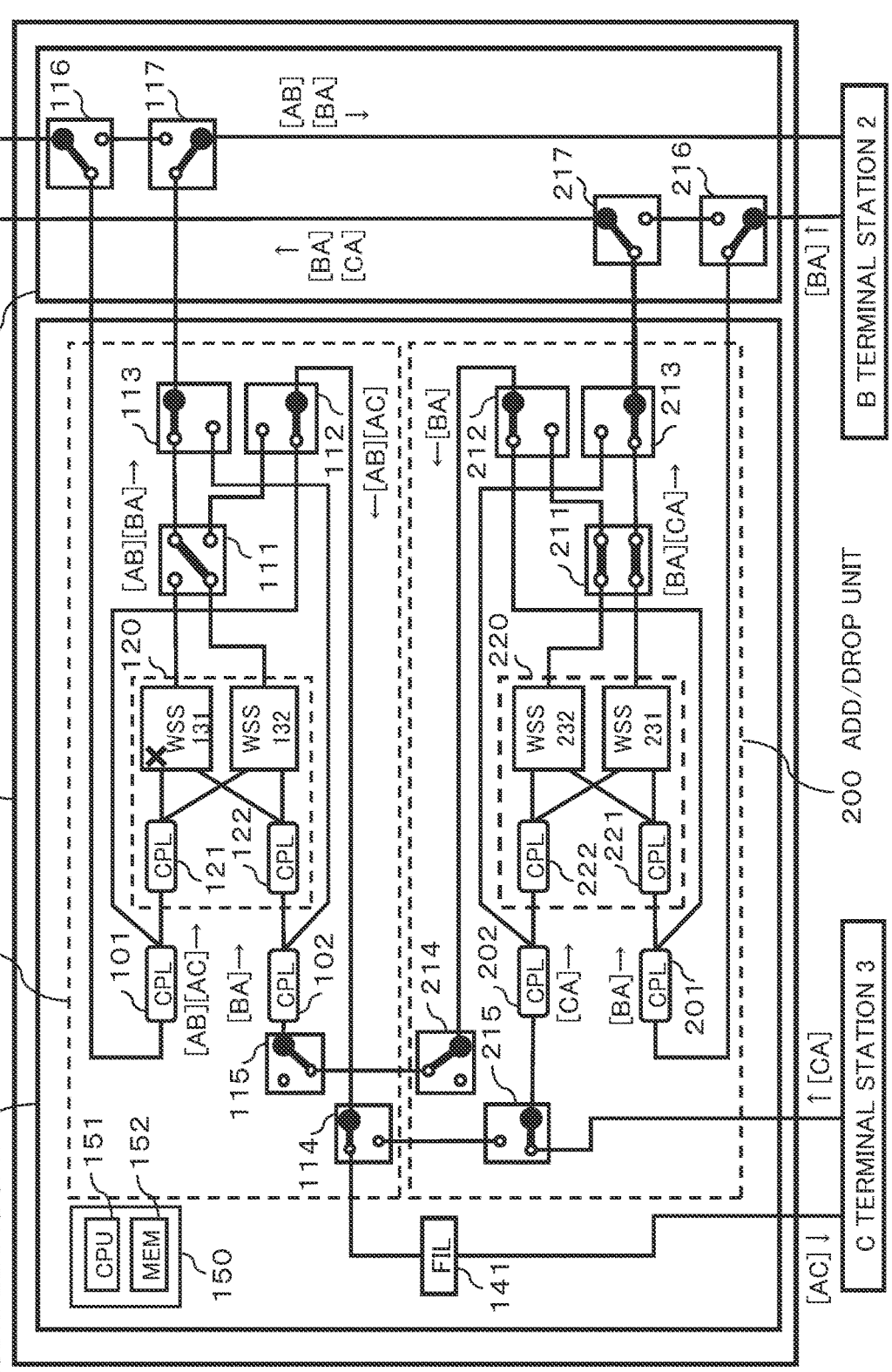
FIG. 11 is a diagram illustrating a case where the WSS 131 fails in the second case.

In FIG. 4 to FIG. 8, the unidirectional communication (the first case) in which the C terminal station 3 communicates with only the B terminal station 2 is described. In FIG. 9 to FIG. 11, unidirectional communication in which the C terminal station 3 communicates with only the A terminal station 1 but the C terminal station 3 does not communicate with the B terminal station 2 (hereinafter, referred to as a "second case") is described.

FIG. 9 is a diagram illustrating the second case where the optical branching/coupling device 10 performs the unidirectional communication. In the second case, the C terminal station 3 transmits an optical signal [CA] to the A terminal station 1 and receives an optical signal [AC] from the A terminal station 1. The A terminal station 1 transmits an optical signal [AB][AC] and receives an optical signal [BA][CA]. The B terminal station 2 transmits only an optical signal [BA] and receives an optical signal [AB][BA].

In FIG. 9, the switches 211, 213, and 217 are controlled in such a way that the optical signal [BA][CA] is output to the A terminal station 1 via the switches 211, 213, and 217. The switches 212, 214, and 115 are controlled in such a way that the optical signal [BA] split in the coupler 201 is input to the coupler 102 of the add/drop unit 100 via these switches. Therefore, the optical signal [AB][AC] is input from the coupler 121 to the WSS 131 and the WSS 132 from the coupler 121, and the optical signal [BA] is input to the WSS 131 and the WSS 132 from the coupler 122.

The WSS 131 multiplexes an optical signal [AB] with the optical signal [BA] and generates the optical signal [AB] [BA]. The generated optical signal [AB][BA] is output from the WSS 131 to the switch 111. In FIG. 9, the switches 111, 113, and 117 are controlled in such a way that the optical signal [AB][BA] is output to the B terminal station 2 via these switches. The WSS 132 demultiplexer the optical signal [AC] from the optical signal [AB][AC]. The demultiplexed optical signal [AC] is output from the WSS 132 to the switch 111. The switches 111, 112, and 114 are controlled in such a way that the optical signal [AC] output by the WSS 132 is output to the C terminal station 3 via these switches.

In this manner, the optical signal [BA] transmitted by the B terminal station 2 and the optical signal [CA] transmitted by the C terminal station 3 are transmitted to the A terminal station 1 being a destination of the transmitted signals. The optical signal [AC] included in the optical signal [AB][AC] transmitted by the A terminal station 1 is transmitted from the WSS 132 to the C terminal station 3 being a destination of the transmitted signal. The optical signal [AB] included in the optical signal [AB][AC] transmitted by the A terminal station 1 is multiplexed with the optical signal [BA] and the resulting signal is transmitted to the B terminal station 2.

In this manner, also, in the second case of the unidirectional communication, the optical signal [AB] addressed to the B terminal station 2 is multiplexed with the optical signal [BA]. As a result, the following advantageous effects are achieved.

(d) Compared with a case where the optical branching/coupling device 10 transmits only the optical signal [AB] to the B terminal station 2, an intensity of an optical signal to be transmitted by the optical branching/coupling device 10 is increased depending on an intensity of the optical signal [BA]. As a result, when an optical transmission path that transmits an optical signal from the optical branching/coupling device 10 to the B terminal station 2 is designed, a design method or a device for an optical transmission path that transmits an optical signal from the A terminal 1 to the optical branching/coupling device 10 can be easily applied. The optical branching/coupling device 10, for example, reduces an intensity difference between optical signals to be transmitted to the optical transmission path, and thereby it becomes easy to commonalize specifications of optical interfaces installed in both ends of the optical transmission path and optical repeaters installed in a middle of the optical transmission path. In other words, also, in the second case, the optical branching/coupling device 10 eases, similarly to the first case, design of a submarine cable system.

(e) In the optical branching/coupling device 10, the optical signal [BA] to be multiplexed with the optical signal [AB] is a signal transmitted by the B terminal station 2. Therefore, the optical signal [BA] addressed to the A terminal station 1 is concealed against a terminal station (e.g., the C terminal station 3) other than a terminal station that transmits/receives the optical signal [BA].

(f) The optical branching/coupling device 10 does not need to include a light source of an optical signal to be multiplexed with the optical signal [AB], and therefore a configuration of the optical branching/coupling device 10 can be avoided from being complex.

(4-2. Case where WSS 231 Fails in Unidirectional Communication)

FIG. 10 is a diagram illustrating an operation example of the optical branching/coupling device 10 in which the WSS 231 fails in the second case illustrated in FIG. 9. In FIG. 10, a mark of "x" of the WSS 231 indicates that the WSS 231 fails. When the WSS 231 fails, the WSS 232 generates an optical signal [BA][CA]. The switch 211 is controlled in such a way that the optical signal [BA][CA] to be output by the WSS 232 is output to the A terminal station 1 via the switches 213 and 217. In other words, when the WSS 231 fails, the switch 211 is controlled in such a way as to connect the WSS 232 and the switch 213.

In the configuration of FIG. 9, an output of the WSS 232 is not used. Therefore, when the WSS 232 fails in the second case, the unidirectional communication can be continued without switching the switch 211 from the state of FIG. 9.

(4-3. Case where WSS 131 Fails in Unidirectional Communication)

FIG. 11 is a diagram illustrating an operation example of the optical branching/coupling device 10 in which the WSS 131 fails in the second case illustrated in FIG. 9. In FIG. 11, a mark of "x" of the WSS 131 indicates that the WSS 131 fails. When the WSS 131 fails, the WSS 132 generates an optical signal [AB][BA]. The switch 111 is controlled in such a way that the optical signal [AB][BA] to be output by the WSS 132 is output to the B terminal station 2 via the switches 113 and 117. In other words, when the WSS 131 fails, the switch 111 is controlled in such a way as to connect the WSS 132 and the switch 113.

When the WSS 131 fails, the WSS 132 is used for generating the optical signal [AB][BA], and therefore it is difficult for the wavelength selection unit 120 to demultiplex, from an optical signal [AB][AC], an optical signal [AC] addressed to the C terminal station 3. Therefore, the optical signal [AB][AC] split in the coupler 101 is output from the switch 114 to the C terminal station 3 via the switch 112. In order to remove an optical signal [AB] from the optical signal [AB][AC] output from the switch 114, a filter 141 may be usable. The filter 141 is, for example, an optical bandpass filter through which only a wavelength band of the optical signal [AC] is transmitted. When the filter 141 is used, only the optical signal [AC] is transmitted to the C terminal station 3, and therefore the optical signal [AB] in which neither a transmission source nor a destination is the C terminal station 3 can be prevented from being received in the C terminal station 3. The filter 141 may be disposed in a middle of an optical path between the switch 115 and the C terminal station 3. In the second case, the filter 141 may be always disposed, regardless of an operation state of the optical branching/coupling device 10.

When the WSS 132 fails in the configuration of FIG. 9, the WSS 131 generates the optical signal [AB][BA]. The optical signal [AB][BA] is output to the B terminal station 2 via the switches 111 and 113 and the switch 117. The optical signal [AB][AC] split in the coupler 101 is output from the switch 114 to the C terminal station 3 via the switch 112. Herein, similarly to the case where the WSS 131 fails, the filter 141 through which only the optical signal [AC] is transmitted may be usable.

As described in FIG. 10 and FIG. 11, in the optical branching/coupling device 10, each of the add/drop units 100 and 200 includes the redundant configuration of the WSS. Therefore, the optical branching/coupling device 10 achieves, also in the second case, an advantageous effect in which reliability for a function of the WSS is high, in addition to the advantageous effects of (d) to (f) described above.

As described above, the optical branching/coupling device 10 includes a configuration adaptive to the bidirectional communication and the unidirectional communication. The optical branching/coupling device 10 multiplexes, when the C terminal station 3 communicates with only the B terminal station 2, the optical signal [AB] received from the A terminal station 1 with the optical signal [BA] received from the B terminal station 2 and outputs the resulting signal to the A terminal station 1. The optical branching/coupling device 10 multiplexes, when the C terminal station 3 communicates with only the A terminal station 1, the optical signal [BA] received from the B terminal station 2 with the optical signal [AB] received from the A terminal station 1 and outputs the resulting signal to the B terminal station 2.

Based on such a configuration, when an optical transmission path that transmits an optical signal from the optical branching/coupling device 10 to the A terminal station 1 and the B terminal station 2 is designed, a design method or a device for the optical transmission path similar to the bidirectional communication can be easily applied. In this case, the optical branching/coupling device 10 does not need to include a light source. A transmission source and a destination of a multiplexed optical signal are either of the A terminal station 1 and the B terminal station 2, and therefore an optical signal can be prevented from being received in an unexpected terminal station.

The optical branching/coupling device 10 includes the add/drop units 100 and 200, and each of the units includes the redundant WSS. Therefore, even when any either of WSSs fails, transmission of an optical signal among the terminal stations 1 to 3 is maintained.

The CPU 151 of the control circuit 150 and the storage device 152 may be included in any location of the optical branching/coupling device 10. The CPU 151 executes a program stored in the storage device 152 and achieves a function of the optical branching/coupling device 10. The storage device 152 is a fixed, non-transitory storage medium. As the storage medium, a semiconductor memory or a fixed magnetic disk device is used, but is not limited thereto.

Second Example Embodiment

Figure 12:
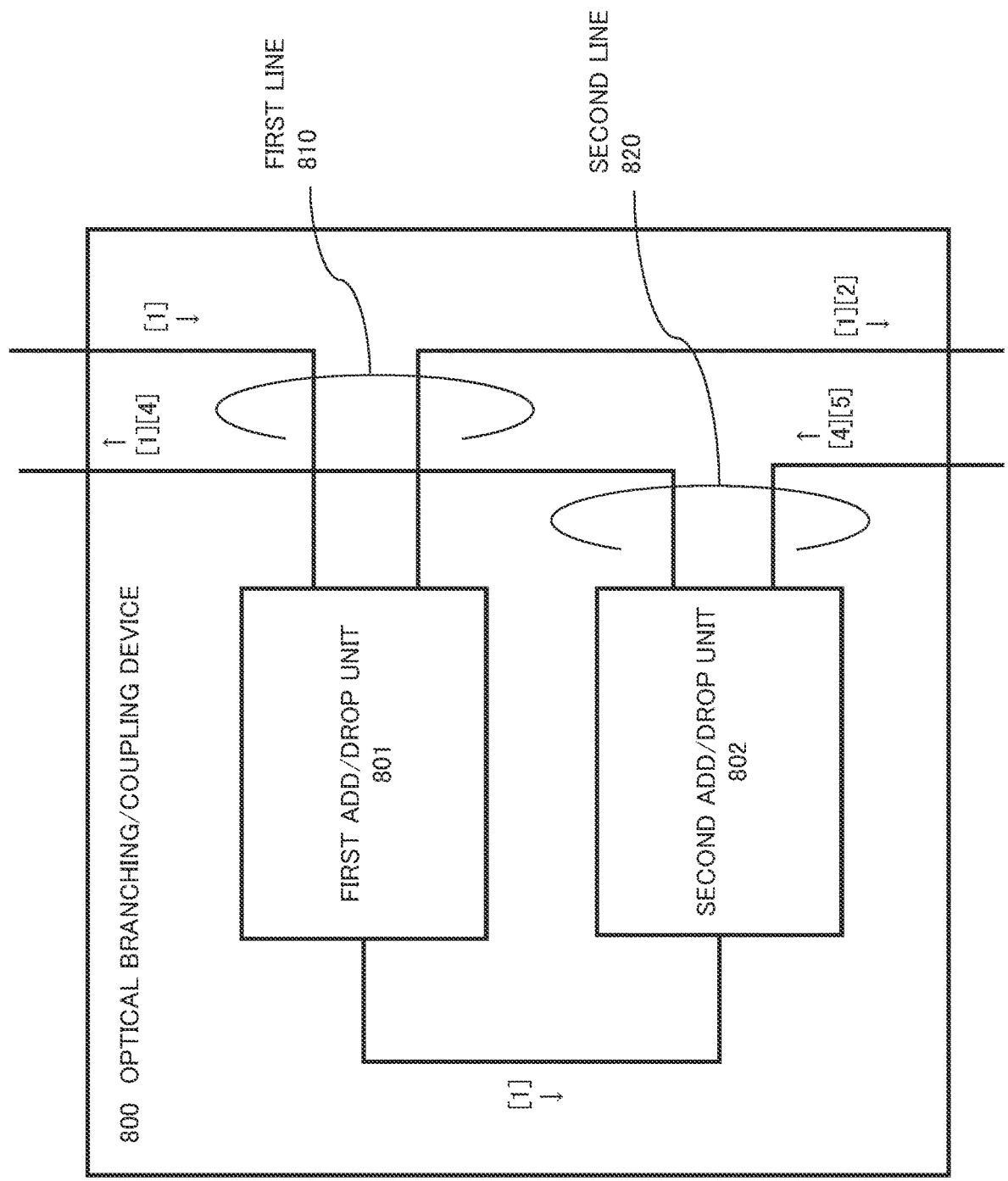
FIG. 12 is a block diagram illustrating a configuration example of an optical branching/coupling device 800 according to a second example embodiment.

FIG. 12 is a block diagram illustrating a configuration example of an optical branching/coupling device 800 according to a second example embodiment of the present invention. The optical branching/coupling device 800 includes a first add/drop unit 801 and a second add/drop unit 802. In the following description and drawings, a reference sign for an optical signal is indicated by [1] and the like.

The first add/drop unit 801 outputs, to a first line 810, a third optical signal [1][2] acquired by wavelength-multiplexing (multiplexing) a first optical signal [1] received from the first line 810 with a second optical signal [2] to be inserted into the first line 810. The first add/drop unit 801 outputs the first optical signal [1] to the second add/drop unit 802.

The second add/drop unit 802 receives, from a second line 820 being a line different from the first line 810, a sixth optical signal [4][5] acquired by wavelength-multiplexing a fourth optical signal [4] with a fifth optical signal [5] The second add/drop unit 802 demultiplexer the fourth optical signal [4] and the optical signal [5] and outputs, to the second line 820, a seventh optical signal [4][1] acquired by wavelength-multiplexing the fourth optical signal [4] with the first optical signal [1] received from the first add/drop unit.

The optical branching/coupling device 800 including such a configuration receives, from the second line 820, the sixth optical signal acquired by wavelength-multiplexing the fourth optical signal with the fifth optical signal and in addition, outputs, to the second line 820, the seventh optical signal acquired by wavelength-multiplexing the fourth optical signal with the first optical signal.

Figure 13:
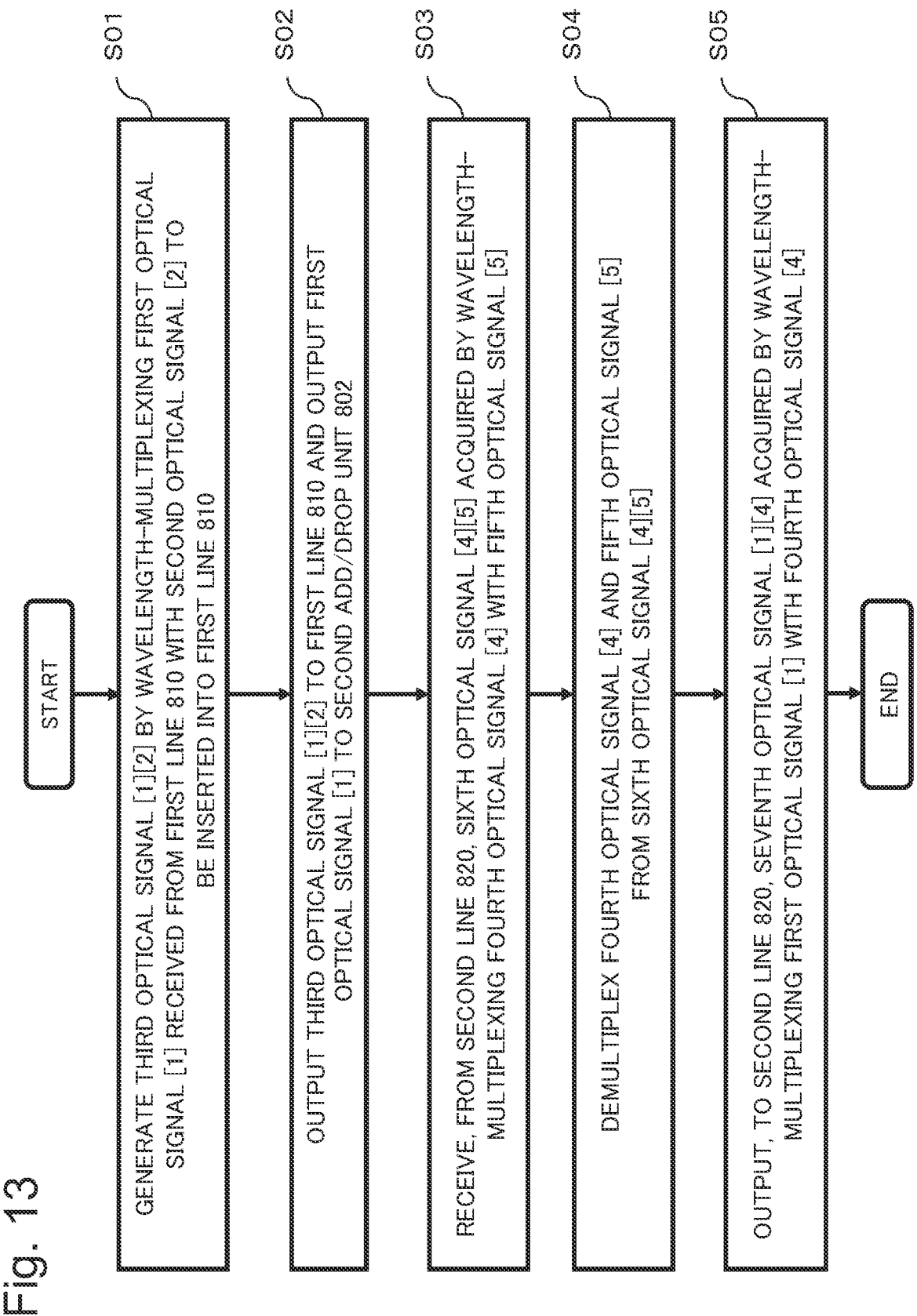
FIG. 13 is a flowchart illustrating an example of an operation procedure of the optical branching/coupling device 800.
Figure 14:
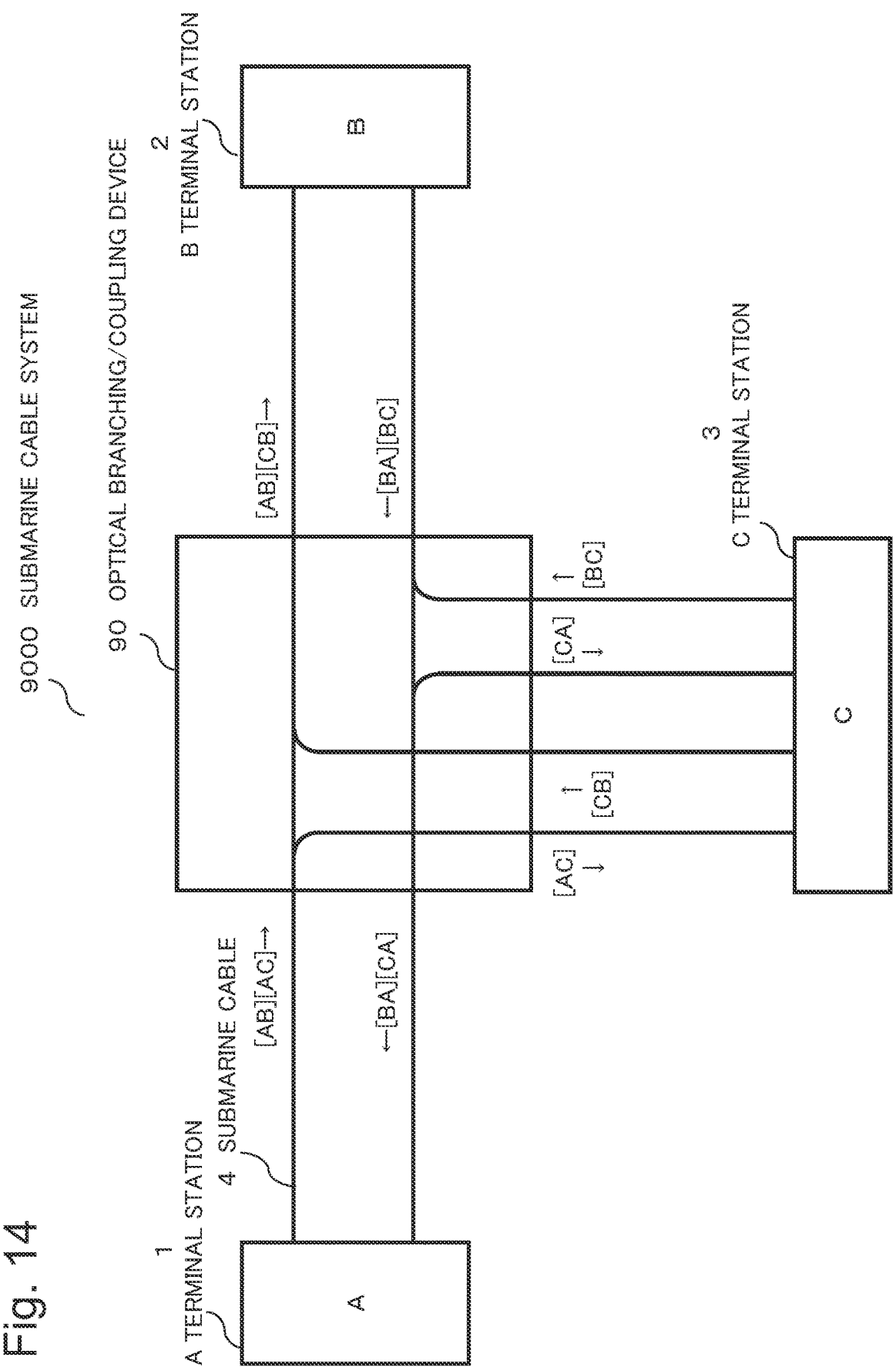
FIG. 14 is a diagram illustrating a configuration of a general submarine cable system 9000.

FIG. 13 is a flowchart illustrating an example of an operation procedure of the optical branching/coupling device 800. The first add/drop unit 801 generates the third optical signal [1][2] acquired by wavelength-multiplexing the first optical signal [1] received from the first line 810 with the second optical signal [2] to be inserted into the first line 810 (step S01 in FIG. 13). The first add/drop unit 801 outputs the generated third optical signal [1][2] to the first line 810 and outputs the first optical signal [1] to the second add/drop unit 802 (step S02).

The second add/drop unit 802 receives the first optical signal [1] from the first add/drop unit. The second add/drop unit 802 receives, from the second line 820 different from the first line 810, the sixth optical signal [4][5] acquired by wavelength-multiplexing the fourth optical signal [4] with the fifth optical signal [5] to be dropped from the second line 820 (step S03). The second add/drop unit 802 demultiplexer the fourth optical signal [4] and the fifth optical signal [5] and outputs, to the second line 820, the seventh optical signal [1][4] acquired by wavelength-multiplexing the fourth optical signal [4] with the first optical signal [1] transmitted by the first add/drop unit 801.

The optical branching/coupling device 800 can output the seventh optical signal [1][4] having a stronger intensity, compared with a case where only the fourth optical signal [4] is transmitted to the second line 820. As a result, when the second line 820 on a side where the optical branching/coupling device 800 transmits the seventh optical signal [1][4] is designed, a design method or a device of the second line 820 on a side where the optical branching/coupling device 800 receives the sixth optical signal [4][5] can be easily applied.

In this case, the optical branching/coupling device 800 does not need to include a light source. In addition, the multiplexed optical signal [1] and the optical signal [4] are not transmitted to any location other than the first line and the second line, and therefore the optical signal [1] can be prevented from being received in a device connected to a location other than these lines.

The example embodiments according to the present invention can be described as, but not limited to, the following supplementary notes.

(Supplementary Note 1)

An optical branching/coupling device including:
- a first add/drop means that outputs, to a first line, a third optical signal acquired by multiplexing a first optical signal received from the first line with a second optical signal to be inserted into the first line and outputs the first optical signal; and
- a second add/drop means that receives the first optical signal, receives, from a second line different from the first line, a sixth optical signal acquired by wavelength-multiplexing a fourth optical signal with a fifth optical signal to be dropped from the second line, demultiplexer the fourth optical signal and the fifth optical signal, and outputs, to the second line, a seventh optical signal acquired by multiplexing the fourth optical signal with the first optical signal transmitted by the first add/drop means.

(Supplementary Note 2)

The optical branching/coupling device according to supplementary note 1, further including
- a path switching means that switches whether a path of the first line passes through the first add/drop means and switches whether a path of the second line passes through the second add/drop means.

(Supplementary Note 3)

The optical branching/coupling device according to supplementary note 1 or 2, wherein
- the first add/drop means and the second add/drop means each include a redundant wavelength selective switch (WSS) and output an optical signal generated by the WSS to the first line or the second line.

(Supplementary Note 4)

The optical branching/coupling device according to any one of supplementary notes 1 to 3, wherein
- the first optical signal is an optical signal to be transmitted from a first terminal station to a second terminal station via the optical branching/coupling device,
- the second optical signal is an optical signal to be transmitted from a third terminal station to the second terminal station via the optical branching/coupling device,
- the fourth optical signal is an optical signal to be transmitted from the second terminal station to the first terminal station via the optical branching/coupling device, and
- the fifth optical signal is an optical signal to be transmitted from the second terminal station to the third terminal station via the optical branching/coupling device.

(Supplementary Note 5)

The optical branching/coupling device according to supplementary note 4, wherein
- the second add/drop means
- outputs, to the second line, a ninth optical signal acquired by multiplexing the fourth optical signal received from the second line with an eighth optical signal to be inserted into the second line and outputs the fourth optical signal to the first add/drop means, and
- the first add/drop means
- receives the fourth optical signal from the second add/drop means, receives, from the first line, an eleventh optical signal acquired by wavelength-multiplexing the first optical signal with a tenth optical signal to be dropped from the first line, demultiplexer the first optical signal and the tenth optical signal, and outputs, to the first line, a twelfth optical signal acquired by multiplexing the first optical signal with the fourth optical signal.

(Supplementary Note 6)

The optical branching/coupling device according to supplementary note 5, wherein
- the eighth optical signal is an optical signal to be transmitted from the third terminal station to the first terminal station via the optical branching/coupling device, and
- the tenth optical signal is an optical signal to be transmitted from the first terminal station to the third terminal station via the optical branching/coupling device.

(Supplementary Note 7)

An optical communication system including:
- the first to the third terminal stations; and
- the optical branching/coupling device according to any one of supplementary notes 4 to 6 being communicably connected to the first to the third terminal stations.

(Supplementary Note 8)

An optical branching/coupling method including:
- receiving a first optical signal from a first line;
- outputting, to the first line, a third optical signal acquired by multiplexing the first optical signal with a second optical signal to be inserted into the first line;
- receiving, from a second line different from the first line, a sixth optical signal acquired by wavelength-multiplexing a fourth optical signal with a fifth optical signal to be dropped from the second line;
- demultiplexing the fourth optical signal and the fifth optical signal; and
- outputting, to the second line, a seventh optical signal acquired by multiplexing the fourth optical signal with the first optical signal.

(Supplementary Note 9)

The optical branching/coupling method according to supplementary note 8, further including
- switching a path of the first line in such a way that the third optical signal is output to the first line, and switching a path of the second line in such a way that the seventh optical signal is output to the second line.

(Supplementary Note 10)

The optical branching/coupling method according to supplementary note 9, further including receiving the fourth optical signal from the second line;

outputting, to the second line, a ninth optical signal acquired by multiplexing the fourth optical signal with an eighth optical signal to be inserted into the second line;

receiving, from the first line, an eleventh optical signal acquired by wavelength-multiplexing the first optical signal with a tenth optical signal to be dropped from the first line;

demultiplexing the first optical signal and the tenth optical signal; and outputting, to the first line, a twelfth optical signal acquired by multiplexing the first optical signal with the fourth optical signal.

(Supplementary Note 11)

A program for causing a computer of an optical branching/coupling device to execute:

a procedure of outputting, to a first line, a third optical signal acquired by multiplexing a first optical signal received from the first line with a second optical signal to be inserted into the first line;

a procedure of receiving, from a second line different from the first line, a sixth optical signal acquired by wavelength-multiplexing a fourth optical signal with a fifth optical signal to be dropped from the second line;

a procedure of demultiplexing the fourth optical signal and the fifth optical signal; and a procedure of outputting, to the second line, a seventh optical signal acquired by multiplexing the fourth optical signal with the first optical signal.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. For example, according to the first example embodiment, an example in which the present invention is applied to a submarine cable system 1000 is described. However, applications of the present invention are not limited to a submarine cable system. The present invention is also applicable to an onshore optical transmission system.

This application is based upon and claims the benefit of priority from Japanese patent application No. 2019-032721, filed on Feb. 26, 2019, the disclosure of which is incorporated herein in its entirety by reference.

REFERENCE SIGNS LIST

1 A terminal station
2 B terminal station
3 C terminal station
4 Submarine cable
10, 90 Optical branching/coupling device
11 Wavelength-demultiplexing/multiplexing unit
12 Path switching unit
100, 200 Add/drop unit
101, 102, 121, 122, 201, 202, 221, 222 Coupler
111 to 117, 211 to 217 Switch
120, 220 Wavelength selection unit
141, 241 Filter
150 Control circuit
151 CPU
152 Storage device
800 Optical branching/coupling device
801 First add/drop unit
802 Second add/drop unit
810 First line
820 Second line
1000, 9000, 9001 Submarine cable system

What is claimed is:

1. An optical branching/coupling device comprising:
a first add/drop circuit configured to output, to a first line, a third optical signal acquired by multiplexing a first optical signal received from the first line with a second optical signal to be inserted into the first line, and outputting the first optical signal; and
a second add/drop circuit configured to receive the first optical signal, receiving, from a second line different from the first line, a sixth optical signal acquired by wavelength-multiplexing a fourth optical signal with a fifth optical signal to be dropped from the second line, demultiplexing the fourth optical signal and the fifth optical signal, and outputting, to the second line, a seventh optical signal acquired by multiplexing the fourth optical signal with the first optical signal transmitted by the first add/drop circuit.

2. The optical branching/coupling device according to claim 1, further comprising
a path switching circuit configured to switch whether a path of the first line passes through the first add/drop circuit and switching whether a path of the second line passes through the second add/drop circuit.

3. The optical branching/coupling device according to claim 2, wherein
the first add/drop circuit and the second add/drop circuit each include a redundant wavelength selective switch (WSS) and output an optical signal generated by the WSS to the first line or the second line.

4. The optical branching/coupling device according to claim 2, wherein
the first optical signal is an optical signal to be transmitted from a first terminal station to a second terminal station via the optical branching/coupling device,
the second optical signal is an optical signal to be transmitted from a third terminal station to the second terminal station via the optical branching/coupling device,
the fourth optical signal is an optical signal to be transmitted from the second terminal station to the first terminal station via the optical branching/coupling device, and
the fifth optical signal is an optical signal to be transmitted from the second terminal station to the third terminal station via the optical branching/coupling device.

5. The optical branching/coupling device according to claim 4, wherein
the second add/drop circuit
outputs, to the second line, a ninth optical signal acquired by multiplexing the fourth optical signal received from the second line with an eighth optical signal to be inserted into the second line, and outputs the fourth optical signal to the first add/drop circuit, and
the first add/drop circuit
receives the fourth optical signal from the second add/drop circuit, receives, from the first line, an eleventh optical signal acquired by wavelength-multiplexing the first optical signal with a tenth optical signal to be dropped from the first line, demultiplexes the first optical signal and the tenth optical signal, and outputs, to the first line, a twelfth optical signal acquired by multiplexing the first optical signal with the fourth optical signal.

6. The optical branching/coupling device according to claim 1, wherein
the first add/drop circuit and the second add/drop circuit each include a redundant wavelength selective switch (WSS) and output an optical signal generated by the WSS to the first line or the second line.

7. The optical branching/coupling device according to claim 6, wherein
the first optical signal is an optical signal to be transmitted from a first terminal station to a second terminal station via the optical branching/coupling device,
the second optical signal is an optical signal to be transmitted from a third terminal station to the second terminal station via the optical branching/coupling device,
the fourth optical signal is an optical signal to be transmitted from the second terminal station to the first terminal station via the optical branching/coupling device, and
the fifth optical signal is an optical signal to be transmitted from the second terminal station to the third terminal station via the optical branching/coupling device.

8. The optical branching/coupling device according to claim 7, wherein
the second add/drop circuit
outputs, to the second line, a ninth optical signal acquired by multiplexing the fourth optical signal received from the second line with an eighth optical signal to be inserted into the second line, and outputs the fourth optical signal to the first add/drop circuit, and
the first add/drop circuit
receives the fourth optical signal from the second add/drop circuit, receives, from the first line, an eleventh optical signal acquired by wavelength-multiplexing the first optical signal with a tenth optical signal to be dropped from the first line, demultiplexes the first optical signal and the tenth optical signal, and outputs, to the first line, a twelfth optical signal acquired by multiplexing the first optical signal with the fourth optical signal.

9. The optical branching/coupling device according to claim 1, wherein
the first optical signal is an optical signal to be transmitted from a first terminal station to a second terminal station via the optical branching/coupling device,
the second optical signal is an optical signal to be transmitted from a third terminal station to the second terminal station via the optical branching/coupling device,
the fourth optical signal is an optical signal to be transmitted from the second terminal station to the first terminal station via the optical branching/coupling device, and
the fifth optical signal is an optical signal to be transmitted from the second terminal station to the third terminal station via the optical branching/coupling device.

10. The optical branching/coupling device according to claim 9, wherein
the second add/drop circuit
outputs, to the second line, a ninth optical signal acquired by multiplexing the fourth optical signal received from the second line with an eighth optical signal to be inserted into the second line, and outputs the fourth optical signal to the first add/drop circuit, and
the first add/drop circuit
receives the fourth optical signal from the second add/drop circuit, receives, from the first line, an eleventh optical signal acquired by wavelength-multiplexing the first optical signal with a tenth optical signal to be dropped from the first line, demultiplexes the first optical signal and the tenth optical signal, and outputs, to the first line, a twelfth optical signal acquired by multiplexing the first optical signal with the fourth optical signal.

11. The optical branching/coupling device according to claim 10, wherein
the eighth optical signal is an optical signal to be transmitted from the third terminal station to the first terminal station via the optical branching/coupling device, and
the tenth optical signal is an optical signal to be transmitted from the first terminal station to the third terminal station via the optical branching/coupling device.

12. An optical communication system comprising:
the first to the third terminal stations; and
the optical branching/coupling device according to claim 9, being communicably connected to the first to the third terminal stations.

13. An optical branching/coupling method comprising:
receiving a first optical signal from a first line;
outputting, to the first line, a third optical signal acquired by multiplexing the first optical signal with a second optical signal to be inserted into the first line;
receiving, from a second line different from the first line, a sixth optical signal acquired by wavelength-multiplexing a fourth optical signal with a fifth optical signal to be dropped from the second line;
demultiplexing the fourth optical signal and the fifth optical signal; and
outputting, to the second line, a seventh optical signal acquired by multiplexing the fourth optical signal with the first optical signal.

14. The optical branching/coupling method according to claim 13, further comprising switching a path of the first line in such a way that the third optical signal is output to the first line, and switching a path of the second line in such a way that the seventh optical signal is output to the second line.

15. The optical branching/coupling method according to claim 14, further comprising:
receiving the fourth optical signal from the second line;
outputting, to the second line, a ninth optical signal acquired by multiplexing the fourth optical signal with an eighth optical signal to be inserted into the second line;
receiving, from the first line, an eleventh optical signal acquired by wavelength-multiplexing the first optical signal with a tenth optical signal to be dropped from the first line;
demultiplexing the first optical signal and the tenth optical signal; and
outputting, to the first line, an eleventh optical signal acquired by multiplexing the first optical signal with the fourth optical signal.

16. A tangible and non-transitory recording medium for a program for causing a computer of an optical branching/coupling device to execute:
a procedure of outputting, to a first line, a third optical signal acquired by multiplexing a first optical signal received from the first line with a second optical signal to be inserted into the first line;

a procedure of receiving, from a second line different from the first line, a sixth optical signal acquired by wavelength-multiplexing a fourth optical signal with a fifth optical signal to be dropped from the second line;

a procedure of demultiplexing the fourth optical signal and the fifth optical signal; and a procedure of outputting, to the second line, a seventh optical signal acquired by multiplexing the fourth optical signal with the first optical signal.

\* \* \* \* \*